US010153928B2

(12) United States Patent
Haran

(10) Patent No.: US 10,153,928 B2
(45) Date of Patent: Dec. 11, 2018

(54) ENERGY EFFICIENT HIGHWAY ADDRESSABLE REMOTE TRANSDUCER COHERENT 8-ARY PHASE SHIFT KEYING MODEM

(71) Applicant: Smart Embedded Systems, Inc., Fremont, CA (US)

(72) Inventor: Pranatharthi Subbaratnam Haran, Fremont, CA (US)

(73) Assignee: Smart Embedded Systems, Inc., Fremont, CA (US)

( * ) Notice: Subject to any disclaimer, the term of this patent is extended or adjusted under 35 U.S.C. 154(b) by 0 days.

(21) Appl. No.: 15/905,786

(22) Filed: Feb. 26, 2018

(65) Prior Publication Data

US 2018/0191539 A1    Jul. 5, 2018

Related U.S. Application Data

(63) Continuation-in-part of application No. 15/294,680, filed on Oct. 15, 2016, now abandoned.

(51) Int. Cl.
*H04L 27/10* (2006.01)
*H04L 27/20* (2006.01)

(52) U.S. Cl.
CPC .................. *H04L 27/20* (2013.01)

(58) Field of Classification Search
CPC ... H04L 27/20; H04L 25/03343; H04L 27/12; H04L 27/2273; H04B 3/04

(Continued)

(56) References Cited

U.S. PATENT DOCUMENTS 6,297,691 B1 * 10/2001 Anderson ........... H04L 27/2273
                                                                  329/300
9,106,488 B1 *  8/2015 Haran .................... H04L 27/12
(Continued)

OTHER PUBLICATIONS

Fisher-Rosemount Performance Technologies, High Speed HART Prototype Modem Project, Theory of Operation, prepared for the HART Communication Foundation, Revision 2.3. USA, 1998.

(Continued)

*Primary Examiner* — Phuong Phu
(74) *Attorney, Agent, or Firm* — Ashok Tankha; Lipton, Weinberger & Husick

(57) ABSTRACT

A method and a highway addressable remote transducer (HART) modem for modulating and demodulating an analog signal including a HART message are provided. With low power consumption, the less computationally intensive HART modem modulates the analog signal using a coherent 8-ary phase shift keying (C8PSK) technique with a predefined gray code lookup table and a pre-generated sample lookup table having phase modulated digital signals indexed by index vectors, and transmits a HART C8PSK analog signal to sensor devices. A C8PSK demodulator in the HART modem demodulates the HART C8PSK analog signal by performing coarse estimation and fine estimation of phase errors and by estimation of a timing offset using a decision estimator. An automatic modulation classifier of the C8PSK demodulator validates presence of the analog signal in a C8PSK protocol by determining signs of in-phase and quadrature phase signals corresponding to each subsequent processed digitized sample of the analog signal.

15 Claims, 19 Drawing Sheets

(58) Field of Classification Search
USPC .................. 375/280, 279, 308, 329, 331
See application file for complete search history.

(56) References Cited

U.S. PATENT DOCUMENTS

| | | | |
|---|---|---|---|
| 9,184,965 B1* | 11/2015 | Haran | .............. H04L 27/12 |
| 9,203,665 B1* | 12/2015 | Haran | .............. H04B 3/04 |
| 9,281,978 B1* | 3/2016 | Haran | .............. H04L 27/12 |
| 2013/0051436 A1* | 2/2013 | O'Keeffe | ......... H04L 25/03343 |
| | | | 375/219 |

OTHER PUBLICATIONS

Fisher-Rosemount Performance Technologies, High Speed HART Prototype Modem Project, Final Report, prepared for the HART Communication Foundation, Revision 1.4. USA, 1998.
Wally Pratt, The HART PSK Physical Layer, A Status Report to Membership. USA, 2000.
Zhenghua Jin, Hong Wang, and Zhijia Yang, Low-Power Digital Receiver Structure for Multi-Speed HART, International Journal of Digital Content Technology and it Applications. vol. 5, No. 4, Apr. 2011.

* cited by examiner

| GRAY CODED SYMBOL | TRIBIT VALUE | C8PSK OUTPUT PHASE FOR THE GRAY CODED SYMBOL | 407 |
|---|---|---|---|
| 0 | 000 | -112.5° | |
| 1 | 001 | -157.5° | |
| 2 | 010 | -67.5° | |
| 3 | 011 | -22.5° | |
| 4 | 100 | +112.5° | |
| 5 | 101 | +157.5° | |
| 6 | 110 | +67.5° | |
| 7 | 111 | +22.5° | |

ENERGY EFFICIENT HIGHWAY ADDRESSABLE REMOTE TRANSDUCER COHERENT 8-ARY PHASE SHIFT KEYING MODEM

CROSS-REFERENCE TO RELATED APPLICATIONS

This application is a continuation-in-part application of the non-provisional patent application titled "Energy Efficient Highway Addressable Remote Transducer C8PSK Modem", application Ser. No. 15/294,680, filed in the United States Patent and Trademark Office on Oct. 15, 2016. The specification of the above referenced patent application is incorporated herein by reference in its entirety.

BACKGROUND

Smart field data devices in use today are generally Highway Addressable Remote Transducer (HART) enabled devices. HART is a global standard for sending and receiving digital information across analog wires between smart devices and control or monitoring systems. The HART communications protocol is widely recognized as the industry standard for digitally enhanced 4 milliamperes (mA) to 20 mA smart instrument communication. Use of HART based technology is growing rapidly and most major global instrumentation suppliers offer products with the HART communications protocol. The HART communications protocol enables two-way digital communication with smart instruments without disturbing 4 mA-20 mA analog signals. The HART communications protocol utilizes, for example, the Bell 202 frequency shift keying (FSK) standard of the Bell 202 modulator-demodulator (modem) of Bell System to superimpose digital communication signals at a low level over the 4 mA-20 mA analog signals. HART technology enables two-way field communication and makes it possible for additional information beyond typical process variables to be communicated to and from a smart field instrument. Current deployment of HART field data devices, that is, smart field data devices that support the HART protocol, utilize a hardware based Bell 202 modem at 1200 bits per second and a separate microcontroller for an implementation of the HART communications protocol. There are a number of hardware based modems that use a Bell 202 based modulation scheme, available in the industry. A HART field data device comprises a microcontroller, a HART modem, and an interface arrangement compliant to a conventional 4 mA-20 mA current loop circuit. The HART modem supporting the HART FSK protocol demodulates a non-coherent HART FSK signal by mixing the non-coherent HART FSK signal with a free running oscillator, that is, a carrier signal, and then identifies a phase of a resultant signal. The total component count of the HART modem to perform both modulation and demodulation adds to the overall cost, lowers reliability of the HART modem, and results in high power consumption.

In 2001, the Highway Addressable Remote Transducer (HART) Communication Foundation (HCF) published a high speed HART (HSH) communication protocol at 9600 bits per second speed using a coherent 8-ary phase shift keying (C8PSK) modulation and demodulation scheme. The HSH communication protocol, that is, the HART C8PSK protocol caters for increasing the number of transactions between HART field data devices and control and monitoring systems to realize multiple control functions of the HART field data devices. A physical layer specification of the HART C8PSK protocol specifies that physical device type, message structure, and network configuration rules of the HART C8PSK protocol are same as the physical layer specification of the HART frequency shift keying (FSK) protocol. That is, the HART field data devices can communicate using the HART C8PSK protocol and/or the HART FSK protocol. The HART field data devices employ a modem that functions for both the HART C8PSK protocol and the HART FSK protocol. The analog signals transmitted and received by the HART field data devices are HART C8PSK analog signals or HART FSK analog signals.

FIG. 1 (Prior Art) exemplarily illustrates a typical Highway Addressable Remote Transducer (HART) coherent 8-ary phase shift keying (C8PSK) modulator 100 comprising a C8PSK gray coder 101, raised cosine filters 102 and 103, and mixers 104, 105, and 106, for modulating an analog signal comprising a HART message transmitted by HART field data devices, that is, sensor devices in a field environment. The C8PSK gray coder 101 receives a serial data bit stream obtained on sampling of an analog signal output by the HART field data devices. The C8PSK gray coder 101 divides the received serial data bit stream into symbols comprising three consecutive bits of the serial data bit stream and maps each of the symbols to a phase angle. The C8PSK gray coder 101 also maps each of the phase angles to a corresponding in-phase component and a quadrature phase component. The HART C8PSK specifications further require that the in-phase component and the quadrature phase component be shaped using 50% raised cosine filters 102 and 103 to achieve minimal inter symbol interference. The in-phase component of each of the symbols is shaped through the raised cosine filter 102 and the quadrature phase component of each of the symbols is shaped through another raised cosine filter 103. The raised cosine filters 102 and 103 output an in-phase (I) signal and a quadrature phase (Q) signal corresponding to each of the symbols. The I signal and the Q signal are modulated using a carrier signal of frequency of, for example, 3200 hertz (Hz). The modulation comprises generating a HART C8PSK analog signal by multiplying the resulting output I signal of the raised cosine filter 102 by $\cos(w_c t)$ to obtain a first product and subtracting a second product of the output Q signal of the raised cosine filter 103 and $\sin(w_c t)$ from the first product using the mixers 104, 105, and 106. The HART C8PSK analog signal is represented below:

$$X(t) = I \cos(w_c t) - Q \sin(w_c t)$$

Consider an example where an output sample rate of the Highway Addressable Remote Transducer (HART) coherent 8-ary phase shift keying (C8PSK) analog signal of 25600 Hz is desired from the HART C8PSK modulator 100. For this output sample rate, the raised cosine filters 102 and 103, for example, finite impulse response filters in the HART C8PSK modulator 100 require 17 filter taps. Thus, the raised cosine filters 102 and 103 for the in-phase component and the quadrature phase component respectively, require 17 multiplications and 17 additions each. Further, the in-phase (I) signal and the quadrature phase (Q) signal require 2 more multiplications and an addition each in the mixers 104, 105, and 106. For transmitting one sample of the HART message in the carrier signal, the HART C8PSK modulator 100 involves 36 multiplications and 35 additions. Thus, for an output sample rate of the HART C8PSK analog signal of 25600 Hz, the HART C8PSK modulator 100 performs 921600 multiplications and 896000 additions. All these computations require large computing resources thus making it difficult to meet low power requirements of the HART C8PSK modulator 100 in transmission of analog signals. Therefore, there is a need for a HART C8PSK modem that performs modulation of the received analog signals with low power consumption.

FIG. 2 (Prior Art) exemplarily illustrates a demodulator 200 of a multi-speed Highway Addressable Remote Transducer (HART) (MSH) modem jointly developed by industry majors such as Rosemount Inc., SMAR, Siemens Inc., and the HART Communication Foundation (HCF). The MSH modem comprises a modulator and the demodulator 200. To achieve power efficiency, both the modulator and the demodulator 200 of the MSH modem need to be optimized for power and performance. The demodulator 200 exemplarily illustrated in FIG. 2, is initialized as an incoming signal is a HART coherent 8-ary phase shift keying (C8PSK) analog signal even though the demodulator 200 can classify the incoming signal as a frequency shift keying (FSK) signal and demodulate the FSK signal. The demodulator 200 comprises band pass filters 201 and 213, an automatic gain control circuit 202, an analog-to-digital converter (ADC) 203, a direct current filter 204, mixers 205 and 206, a numerically controlled oscillator 207, a root raised cosine filter 208, an equalizer 209, squaring circuits 210 and 211, a summing circuit 212, a peak detector 214, an interpolator 215, a phase shift keying (PSK) decision module 216, an angle error detector 217, a phase locked loop filter 219, and a frequency shift keying (FSK) decision module 218. The band pass filter 201 filters the incoming signal. The automatic gain control circuit 202 adjusts gain of the incoming signal. The ADC 203 digitizes and converts the gain adjusted signal to digitized samples. The direct current filter 204 smoothens ripples in the digitized samples. In-phase components and quadrature phase components corresponding to the digitized samples are generated using the numerically controlled oscillator 207, the mixers 205 and 206, and the root raised cosine filter 208. The root raised cosine filter 208 is a pulse shaping filter for pulse shaping the generated in-phase components and the generated quadrature phase components to generate in-phase signals and quadrature phase signals. The root raised cosine filter 208 also functions as a low pass filter to remove unwanted high frequencies in the generated in-phase components and the generated quadrature phase components.

The equalizer 209 receives the outputs of the root raised cosine filter 208 and generates delayed in-phase signals and delayed quadrature phase signals that are fed as inputs to a symbol synchronization circuit comprising a pair of squaring circuits 210 and 211. The squaring circuits 210 and 211 square the delayed in-phase signals and the delayed quadrature phase signals and the summing circuit 212 sums the result to produce a demodulated analog signal that is filtered by the band pass filter 213. The peak detector 214 detects peaks of the demodulated analog signal that correspond to sampling time instants of the Highway Addressable Remote Transducer (HART) coherent 8-ary phase shift keying (C8PSK) analog signal that is sampled by the analog-to-digital converter (ADC) 203. The outputs of the equalizer 209 are fed to the interpolator 215 and the angle error detector 217. The interpolator 215 selects a digitized sample of the HART C8PSK analog signal that is to be unmapped and decoded to a symbol with binary bits by the phase shift keying (PSK) decision module 216. The angle error detector 217 identifies the protocol of the incoming signal, that is, whether the incoming signal is a frequency shift keying (FSK) signal or a C8PSK analog signal.

For demodulating the Highway Addressable Remote Transducer (HART) frequency shift keying (FSK) analog signals, the multi-speed HART (MSH) modem uses the equalizer 209 configured as an adaptive equalizer to compensate for cable losses in transmission since the HART FSK signals slightly distort during the transmission. For coherent demodulation of the HART coherent 8-ary phase shift keying (C8PSK) analog signal as per the physical layer specification of the HART C8PSK protocol, the demodulator 200 provides the automatic gain control (AGC) circuit 202, the root raised cosine filter 208, the symbol synchronization circuit, the equalizer 209, the angle error detector 217, and the phase locked loop filter 219 for carrier recovery and signal identification by the phase shift keying (PSK) decision module 216 and the FSK decision module 218 as exemplarily illustrated in FIG. 2. With the additional components to cater for identification and demodulation of both the HART FSK analog signal and the HART C8PSK analog signal, the MSH modem has low reliability with high power consumption. The high power consumption in the demodulator 200 because of the number of multiplications used per symbol demodulation, and multipliers of the demodulator 200 also result in a large area in the MSH modem. Total worst case current is substantially high, more than about 2 mA. Therefore, there is a need for a HART C8PSK modem that performs demodulation of received analog signals with low power consumption.

FIG. 3 (Prior Art) exemplarily illustrates a block diagram of a low power demodulator 300 of a multi-speed Highway Addressable Remote Transducer (HART) (MSH) modem. The low power demodulator 300 receives an incoming signal. The incoming signal is assumed to be a frequency shift keying (FSK) signal and the low power demodulator 300 is accordingly configured. The low power demodulator 300 comprises a band pass filter 301, a variable gain amplifier 302, an analog-to-digital converter (ADC) 303, a direct current filter 304, an automatic modulation classifier and automatic gain control circuit 305, a mixed lookup table 306, a root raised cosine filter lookup table 307, an interpolator 308, a coordinate rotation digital computer (CORDIC) 309, an equalizer adder array 310, a synchronizer tracker 311, a phase shift keying (PSK) decision module 312, an FSK decision module 314, a filter 315, and an output switch 316. The band pass filter 301 filters the incoming FSK signal. The variable gain amplifier 302 adjusts gain of the filtered FSK signal. The ADC 303 digitizes the gain adjusted FSK signal. The direct current filter 304 filters the digitized FSK signal. The automatic modulation classifier and the automatic gain control circuit 305 perform automatic modulation classification and automatic gain control. The automatic modulation classifier determines that the digitized samples of the gain adjusted signal are in the FSK protocol and demodulates the digitized samples using the mixer lookup table 306 and the raise cosine filter lookup table 307. Based on the sign 313 of the generated in-phase signal and the generated quadrature phase signal, the FSK decision module 314 outputs demodulated data through the output switch 316 via the filter 315 after carrier recovery. If the automatic modulation classifier determines that the digitized samples of the gain adjusted signal are in the coherent 8-ary phase shift keying (C8PSK) protocol, the interpolator 308, the CORDIC 309, and the equalizer adder array 310 in coordination with the synchronizer tracker 311 perform timing estimation of the digitized samples of the incoming C8PSK signal to output demodulated digitized samples. The equalizer adder array 310 initializes the synchronizer tracker 311 for a preamble of the HART message in the incoming C8PSK signal and functions as a fixed single preset equalizer that adapts to actual line conditions, that is, the digitized samples of the incoming C8PSK signal present in the low power demodulator 300 after initialization of the synchronizer tracker 311 is complete. Theoretically and in simulations, the low power demodulator 300 functions in accordance with requirements. In the low power demodulator 300 exemplarily illustrated in FIG. 3, the phase of the incoming C8PSK signal is estimated using the following equations:

$$SumQ(m) = \Sigma^{16}_{n=1} Q(n+m)$$

$$SumI(m) = \Sigma^{16}_{n=1} I(n+m)$$

$$Ti(m) = \Sigma^{8}_{n=1} I(n+m) - \Sigma^{15}_{n=8} I(n+m)$$

$$SumQ(m) = A \cos(\Delta\theta)$$

$$SumI(m) = A \sin(\Delta\theta)$$

where $\Delta\theta$ is a carrier phase error and is defined as $\Delta\theta = 45*k+m$, $Q(n)$ is a quadrature phase component of the digitized samples of the received HART C8PSK analog signal, and $I(n)$ is an in-phase component of the digitized samples of the received HART C8PSK analog signal. The resulting SumQ(m) and SumI(m) go through the phase shift keying (PSK) decision module 312, which judges the function parameter k and a lookup table of an abstract value SumQ(m) is used to compute m.

The low power demodulator 300 requires sampling of the received Highway Addressable Remote Transducer (HART) coherent 8-ary phase shift keying (C8PSK) analog signal at 8 times a baud rate of 3200 resulting in a substantially high sampling rate of more than 25 kilohertz (KHz). Another requirement of the multi-speed HART (MSH) modem is to get the low power demodulator 300 in an optimum detection range within a period of 40 symbols or bauds. To achieve this, a fast detection of an incoming phase of the received HART C8PSK analog signal and an estimation of a center point timing of an impulse response, that is, a I/Q waveform of root raised cosine filters in the low power demodulator 300 must be performed. Using the above equations, the low power demodulator 300 requires a substantially high sample rate of 25600 Hz to achieve the above recited requirement. To arrive at an accurate phase error estimate and an estimate of a timing offset, the low power demodulator 300 requires the high sample rate of 25600 Hz. The computing requirements of the MSH modem increase 2 times despite avoiding the use of multipliers. Moreover, the number of computing cycles is a major contributor to the computing requirements. Power consumption of the analog-to-digital converter (ADC) 303 is also increased by 50%. On experimenting, the phase error estimate and the estimate of the timing offset of the analog signal are found to be inaccurate most of the time.

Selection of coefficients of the equalizer in the low power demodulator 300 is performed for reducing a computing rate of the equalizer to minimize power consumption of the low power demodulator 300. An algorithm where a single predetermined equalizer is selected and a timing estimator based on Gardner's algorithm is disclosed below:

$$eT(nT) = I_p(nT)*[I((n+\tfrac{1}{2})T) - I((n-\tfrac{1}{2})T)] + Q_p(nT)*[Q((n+\tfrac{1}{2})T) - Q((n-\tfrac{1}{2})T)]$$

The algorithm is used to estimate the timing offset in the received analog signal. The estimated timing offset is fed back to the interpolator 308 as exemplarily illustrated in FIG. 3, where the interpolator 308 works twice per symbol as shown in the equation below:

$$eC(nT) = I_p(nT)*Q(nT) - I(nT)*Q_p(nT)$$

However, in practice, convergence of the equalizer and proper demodulation of the signal are not always successful. The algorithm above and the interpolator 308 are computationally more intensive. The low power demodulator 300 in the multi-speed Highway Addressable Remote Transducer (HART) (MSH) modem minimizes the number of multiplications needed by in-built algorithms for demodulation of the received HART frequency shift keying (FSK) signal or the received HART coherent 8-ary phase shift keying (C8PSK) analog signal. However, power consumption and cost of implementation of the MSH modem are not reduced. Demodulator structures with configurable filters and oscillators can demodulate the received HART FSK signal or the received HART C8PSK analog signal. However, the power consumption is not low. Furthermore, it is difficult to implement C8PSK modems in application specific integrated circuits (ASICs) that typically implement modems, because the existing C8PSK modem algorithms are too complex to implement in ASICS due to a multi-stage decision making process.

Typically, the Highway Addressable Remote Transducer (HART) coherent 8-ary phase shift keying (C8PSK) modem must perform simultaneous detection of the received analog signal in the frequency shift keying (FSK) protocol, that is, detection of the slower 1200 bits per second Bell 202 based FSK modulation signal, along with the received analog signal in the C8PSK protocol. The simultaneous detection is conventionally implemented by one of many automatic modulation classification (AMC) methods. Many of the AMC methods are computationally intensive and need to be performed at a high sample rate. In the low power demodulator 300 of the multi-speed Highway Addressable Remote Transducer (HART) (MSH) modem exemplarily illustrated in FIG. 3, detection of the analog signal in the FSK protocol is performed and then the low power demodulator 300 is switched to demodulate the analog signal in the C8PSK protocol, which is computationally intensive.

Although modulation is inherently less complex, efficiencies can be achieved in the modulator of the Highway Addressable Remote Transducer (HART) coherent 8-ary phase shift keying (C8PSK) modem too. Hence, to improve power efficiency in the HART C8PSK modem, there is a long felt but unresolved need for modulation and demodulation of the received analog signal to be optimized for power and performance. Moreover, there is a need for a demodulator in the HART C8PSK modem that identifies and adaptively demodulates the received analog signal in the FSK protocol and the C8PSK protocol with low power consumption.

SUMMARY OF THE INVENTION

This summary is provided to introduce a selection of concepts in a simplified form that are further disclosed in the detailed description of the invention. This summary is not intended to determine the scope of the claimed subject matter.

The method and the Highway Addressable Remote Transducer (HART) coherent 8-ary phase shift keying (C8PSK) modem, hereafter referred to as a "HART modem", disclosed herein address the above recited need for optimizing modulation and demodulation of a received analog signal in a C8PSK protocol comprising a HART message for power and performance. Moreover, the method and the HART modem disclosed herein address the above recited need for a demodulator that identifies and adaptively demodulates the received analog signal in the FSK protocol and the C8PSK protocol with low power consumption.

The method and the Highway Addressable Remote Transducer (HART) modem disclosed herein are used in a field environment and achieve a high level of efficiencies in both a modulator and a demodulator of the HART modem. The method disclosed herein employs the HART modem for modulating and transmitting an analog signal comprising a HART message to one or more sensor devices. The method and the HART modem disclosed herein provide a two-step estimation method for phase error estimation of the incoming coherent 8-ary phase shift keying (C8PSK) signal, that is, the incoming analog signal in the C8PSK protocol. The HART modem disclosed herein comprises a decision estimator for performing estimation of a timing offset along with phase error estimation and equalizer selection.

The Highway Addressable Remote Transducer (HART) modem disclosed herein achieves a high level of efficiencies in both modulation and demodulation of an analog signal. The HART modem transmits the HART coherent 8-ary phase shift keying (C8PSK) analog signal, that is, the analog signal in the C8PSK protocol comprising the HART message, and receives and demodulates the C8PSK analog signal to a digital signal using either a frequency shift keying (FSK) technique or a C8PSK technique.

For modulating the received analog signal, the Highway Addressable Remote Transducer (HART) modem performs the method steps of pre-calculating waveforms, hereafter referred to as "phase modulated digital signals", in a pre-generated sample lookup table, generating the pre-generated sample lookup table, and performing a lookup of the pre-generated sample lookup table to determine the phase modulated digital signals indexed by the index vectors. The pre-generated sample lookup table comprising the pre-calculated phase modulated digital signals is stored in a non-volatile memory or a non-transitory computer readable storage medium of a microcontroller of the HART modem. In generating the pre-generated sample lookup table, the HART modem limits other phase modulated digital signals from being pre-calculated using a requirement where frequency of a carrier signal to be used for modulating the received analog signal is specified as 3200 hertz (Hz) and a baud rate of the transmitted analog signal, that is, the HART coherent 8-ary phase shift keying (C8PSK) analog signal is specified as 3200. As phase of a sine wave is the same after each baud of the HART C8PSK analog signal and the sine wave repeats itself, the size of the pre-generated sample lookup table is minimized, for example, to a few kilobytes, thereby avoiding use of larger memory as used in a conventional HART modem.

In the method disclosed herein, the Highway Addressable Remote Transducer (HART) modem for modulating and transmitting an analog signal comprising a HART message to one or more sensor devices is provided. The HART modem disclosed herein comprises multiple analog-to-digital converters (ADCs), a parallel-to-serial converter, a gray coder, a coherent phase shift keying modulator, a digital-to-analog converter (DAC), at least one microcontroller configured to execute computer program instructions for operating the HART modem, and a non-transitory computer readable storage medium for storing a predefined gray code lookup table and a pre-generated sample lookup table. One of the ADCs receives and converts the analog signal into digitized samples by sampling and digitizing the received analog signal at a sampling rate. The parallel-to-serial converter converts the HART message in the digitized samples into serial data bit streams. The serial data bit streams comprise binary information. The gray coder divides each of the serial data bit streams into symbols and gray codes the symbols using the predefined gray code lookup table. Each of the symbols comprises a predetermined number of consecutive bits in each of the serial data bit streams and represents a predetermined number of the digitized samples.

The microcontroller of the Highway Addressable Remote Transducer (HART) modem generates an index vector of the pre-generated sample lookup table for indexing a phase modulated digital signal in the pre-generated sample lookup table by grouping a predetermined number of the gray coded symbols and the predetermined number of the digitized samples. The microcontroller further determines a phase modulated digital signal in the pre-generated sample lookup table, corresponding to the generated index vector of the pre-generated sample lookup table for reducing power intensive computations in phase modulation by the coherent phase shift keying modulator of the HART modem. The digital-to-analog converter (DAC) converts the determined phase modulated digital signal to a phase modulated analog signal and transmits the phase modulated analog signal comprising the HART message to one or more sensor devices via a serial peripheral interface of the HART modem. The transmitted phase modulated analog signal is in the coherent 8-ary phase shift keying (C8PSK) protocol.

The microcontroller of the Highway Addressable Remote Transducer (HART) modem determines in-phase components and quadrature phase components of pre-gray coded symbols corresponding to analog signals received by the HART modem by mapping the pre-gray coded symbols to predetermined phase angles in the predefined gray code lookup table. The coherent phase shift keying modulator comprises root raised cosine filters and mixers. The root raised cosine filters of the coherent phase shift keying modulator pulse shape the determined in-phase components and the determined quadrature phase components of the pre-gray coded symbols corresponding to the received analog signal. The mixers of the coherent phase shift keying modulator modulate the pulse shaped in-phase components and the pulse shaped quadrature phase components with a carrier signal for generating phase modulated digital signals. The microcontroller stores the generated phase modulated digital signals in the pre-generated sample lookup table. The microcontroller generates the pre-generated sample lookup table using the pre-gray coded symbols based on a frequency of the carrier signal being in synchronization with a baud rate of a phase modulated analog signal to be transmitted to one or more sensor devices.

Also, disclosed herein is a method for demodulating an analog signal comprising a Highway Addressable Remote Transducer (HART) message. In the method disclosed herein, the HART modem comprising a coherent phase shift keying demodulator is provided. The coherent phase shift keying demodulator comprises multiple analog-to-digital converters (ADCs), a high pass filter, an energy detector, mixers, root raised cosine filters, a decision estimator, an adaptive equalizer, and a data slicer. One of the ADCs of the coherent phase shift keying demodulator receives and converts an analog signal comprising the HART message into digitized samples by sampling and digitizing the received analog signal at a sampling rate. The high pass filter processes the digitized samples for removing low frequency interfering signals from the digitized samples. The microcontroller compares signal amplitudes of the processed digitized samples with predetermined threshold values and applies a fast energy detection algorithm on the processed digitized samples using the energy detector for determining further signal processing of the processed digitized samples.

The mixers of the coherent phase shift keying demodulator generate an in-phase component and a quadrature phase component of each of the processed digitized samples by mixing each of the processed digitized samples with an in-phase carrier signal and a quadrature phase carrier signal respectively. The root raised cosine filters of the coherent phase shift keying demodulator generate an in-phase signal and a quadrature phase signal corresponding to each of the processed digitized samples by pulse shaping the generated in-phase component and the generated quadrature phase component of each of the processed digitized samples respectively. The coherent phase shift keying demodulator detects the phase of the received analog signal, that is, the coherent 8-ary phase shift keying (C8PSK) analog signal in an optimum detection range, that is, within a period of 40 bauds or symbols. The coherent phase shift keying demodulator performs a fast detection of the incoming phase of the received C8PSK analog signal and estimates a centre point timing of the in-phase signal and the quadrature phase signal corresponding to each of the processed digitized samples. The coherent phase shift keying demodulator uses a two-stage phase error estimation method followed by estimation of a timing offset and optimum equalizer selection. The two-stage phase error estimation comprising a coarse estimation of a phase error and a fine estimation of the phase error, starts after sufficient energy is detected in the processed digitized samples by the energy detector.

The decision estimator of the coherent phase shift keying demodulator performs a coarse estimation of a phase error of each of the processed digitized samples by determining a final phase error correction using the generated in-phase signal and the quadrature phase signal corresponding to each of the processed digitized samples. The decision estimator further performs a fine estimation of the phase error of each of the processed digitized samples using the determined final phase error correction for determining a resultant final phase error correction. The decision estimator further determines coefficients of an adaptive equalizer of the Highway Addressable Remote Transducer (HART) modem and estimates a timing offset in each of the subsequent processed digitized samples for obtaining demodulated digitized samples. The subsequent processed digitized samples are the processed digitized samples of the received analog signal to which a resultant final phase error correction determined on performing the fine estimation of the phase error of each of the previously processed digitized samples is applied. The data slicer of the coherent phase shift keying demodulator assembles a character for character generation of the demodulated digitized samples. The HART modem demodulates the received analog signal in a frequency shift keying (FSK) protocol or demodulates the received analog signal in the coherent phase shift keying (C8PSK) protocol.

The coherent phase shift keying demodulator further comprises an automatic modulation classifier for detecting certain patterns in the coherent 8-ary phase shift keying (C8PSK) demodulated in-phase (I) signals and the quadrature phase (Q) signals, that is, the I signal and the Q signal corresponding to each of the processed digitized samples. The patterns are an indication of the presence of the received analog signal in the C8PSK protocol and by inference, an absence of the received analog signal in the Bell 202 frequency shift keying (FSK) protocol. When the absence of the received analog signal in the C8PSK protocol is asserted by the automatic modulation classifier, the coherent phase shift keying demodulator switches to a FSK demodulation method and detects the incoming FSK signal in time. The automatic modulation classifier validates presence of the received analog signal in the C8PSK protocol and absence of the received analog signal in the FSK protocol by determining signs of an I signal and a Q signal corresponding to each of the subsequent processed digitized samples, generated by the root raised cosine filters of the coherent phase shift keying demodulator, after performing the fine estimation of the phase error of each of the processed digitized samples and the estimation of the timing offset in each of the subsequent processed digitized samples.

Based on the Highway Addressable Remote Transducer (HART) coherent 8-ary phase shift keying (C8PSK) physical layer specification drafted by the HART Communication Foundation (HCF), after computing phase error estimates using the decision estimator of the coherent phase shift keying demodulator and applying the computed phase error estimates to the I signals and the Q signals of the subsequent processed digitized samples, the I signals corresponding to the subsequent processed digitized samples align with same polarity. The automatic modulation classifier avoids any further computational requirements and saves computing cycles and thus reduces power consumption of the HART modem. The coarse estimation of the phase error and the fine estimation of the phase error followed by estimation of the timing offset allow a lower sampling rate of 12800 Hz of the received analog signal and reduces computational complexity in the HART modem. The timing offset estimation in the HART modem is performed by mapping the subsequent processed digitized samples to one of 8 pre-selected equalizers. By implementing algorithms of low complexity and low computational demands, the HART modem provides an improvement in HART C8PSK communications.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
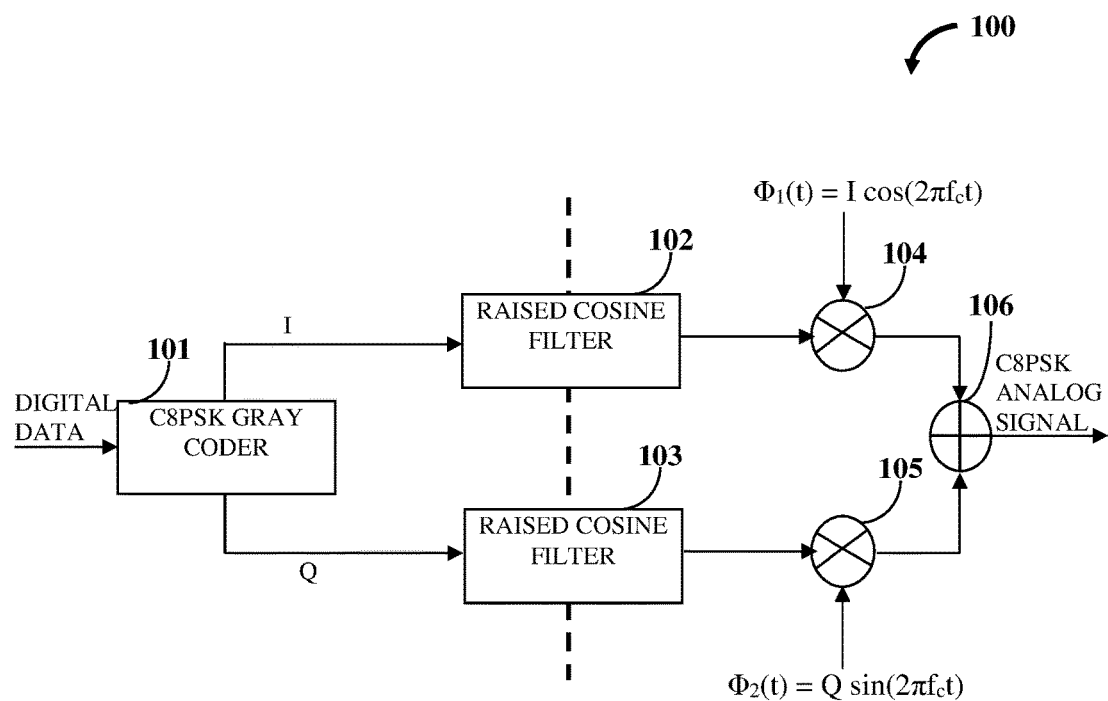
FIG. 1 (Prior Art) exemplarily illustrates a typical Highway Addressable Remote Transducer coherent 8-ary phase shift keying modulator for modulating an analog signal comprising a Highway Addressable Remote Transducer message transmitted by Highway Addressable Remote Transducer field data devices in a field environment.
Figure 2:
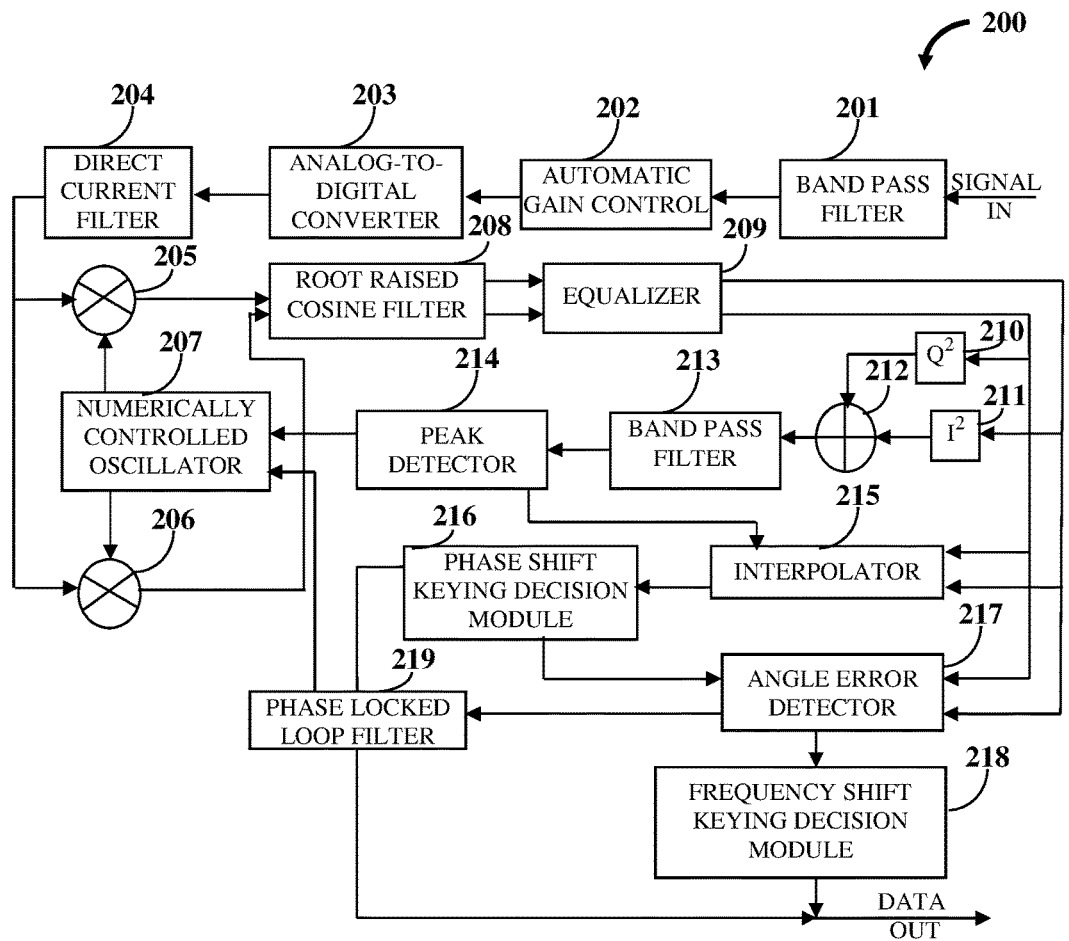
FIG. 2 (Prior Art) exemplarily illustrates a demodulator of a multi-speed Highway Addressable Remote Transducer modem.
Figure 3:
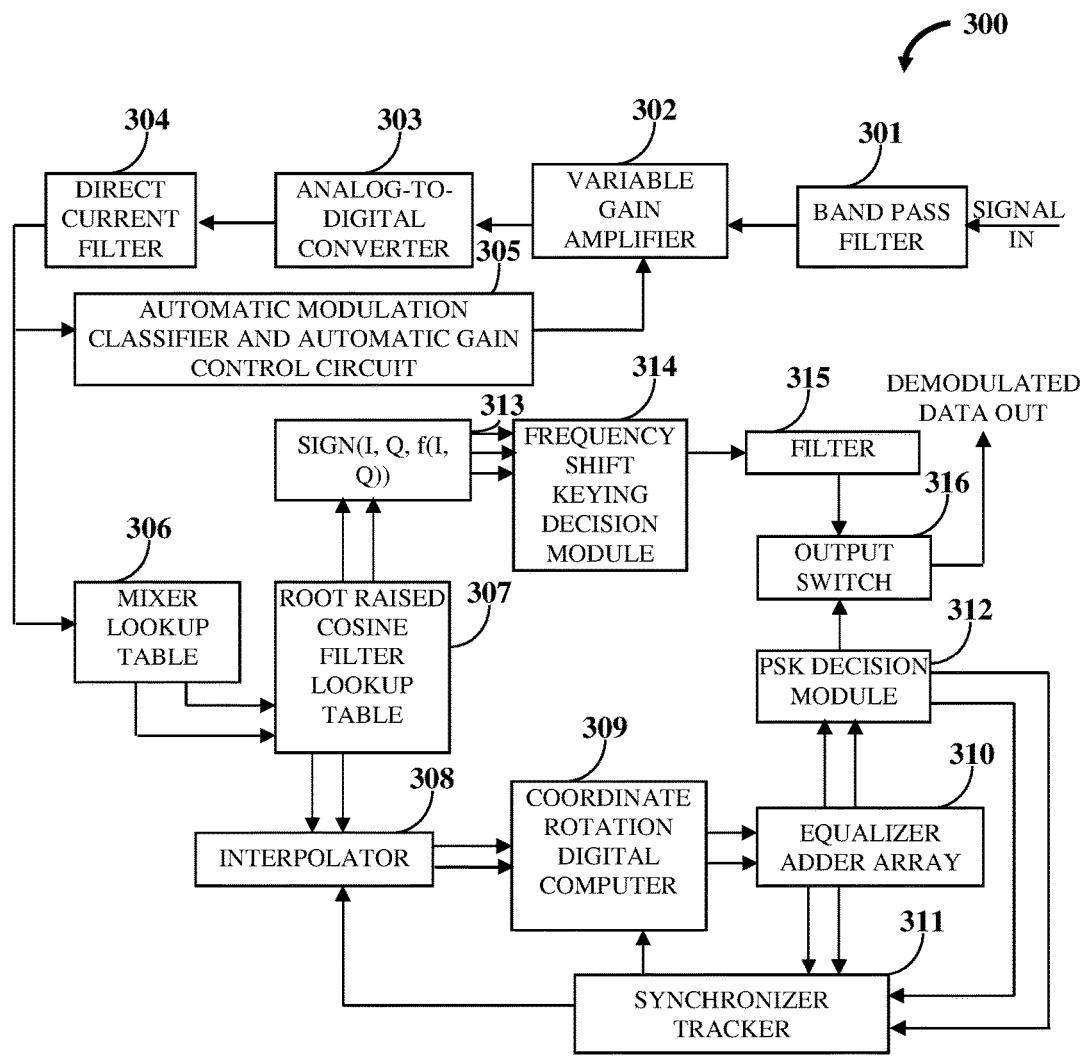
FIG. 3 (Prior Art) exemplarily illustrates a block diagram of a low power demodulator of a multi-speed Highway Addressable Remote Transducer modem.
Figure 4:
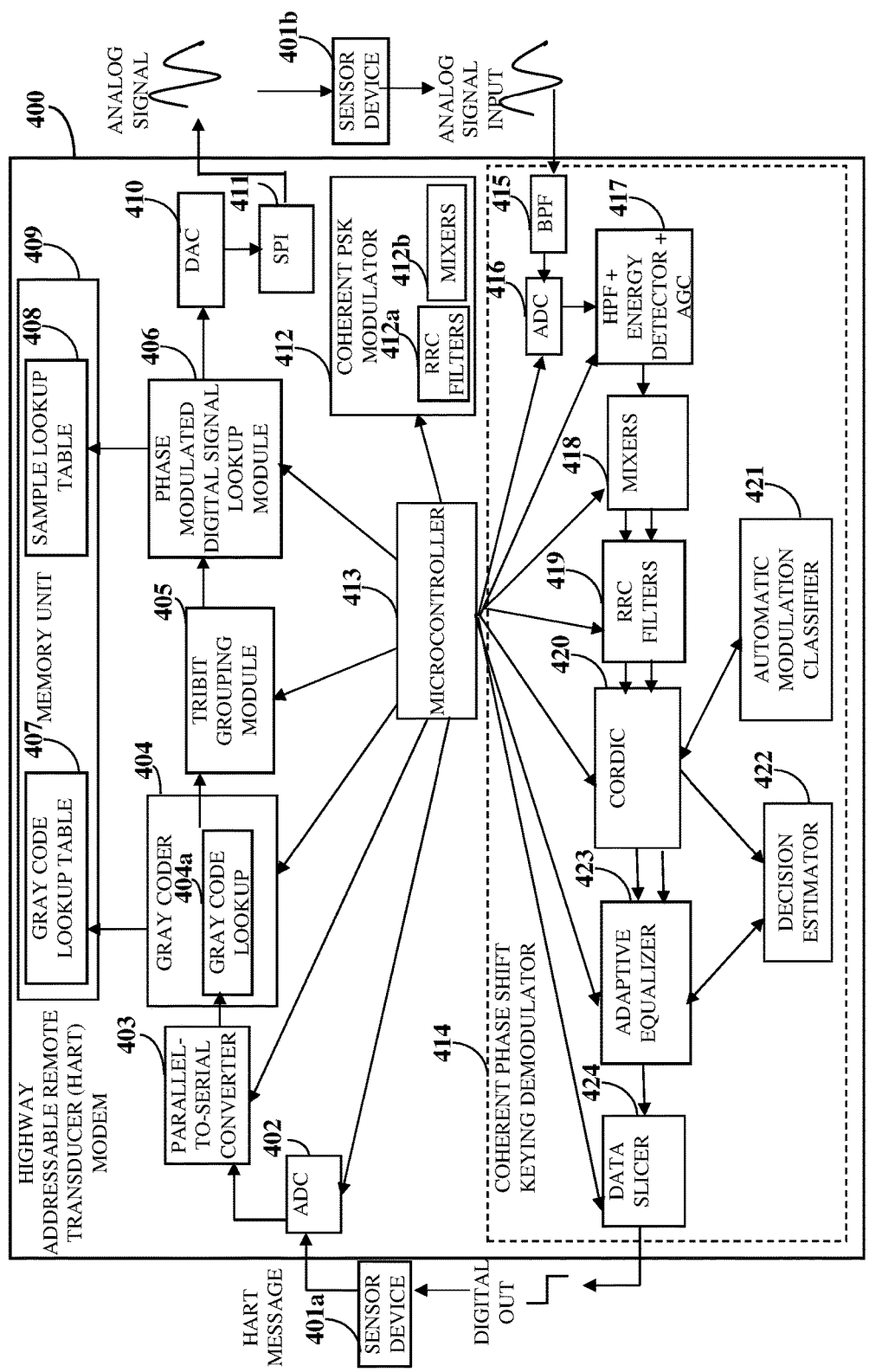
FIG. 4 exemplarily illustrates a block diagram of a Highway Addressable Remote Transducer modem.

FIG. 4 exemplarily illustrates a block diagram of a Highway Addressable Remote Transducer (HART) modem 400. The HART modem 400 is a modem that performs modulation and demodulation of an analog signal in a HART coherent 8-ary phase shift keying (C8PSK) protocol. High speed smart sensor devices 401a and 401b use HART C8PSK modulation to transmit HART communication analog signals. The high speed HART C8PSK protocol is a communication protocol used worldwide in industrial applications, with majority of the smart sensor devices 401a and 401b and intelligent process measurement and control systems utilizing HART communication technology. The HART C8PSK protocol is a two-way communication protocol that caters for an increased number of transactions between the sensors devices 401a and 401b and control systems in an industrial application. The sensor devices 401a and 401b and the control systems communicate via 4 milliamperes (mA) to 20 mA analog signals that are modulated by C8PSK. The HART modem 400 also supports a HART frequency shift keying (FSK) protocol. In the HART FSK protocol, the HART modem 400 modulates the 4 mA-20 mA analog signal to frequencies of 1200 hertz (Hz) and 2200 Hz based on 0 bit and 1 bit in a HART message transmitted by a sensor device 401a or 401b.

The sensor devices 401a and 401b transmit analog data, for example, sensed parameters such as temperature, pressure, etc., and digital data representing, for example, identifiers (ID) of the sensor devices 401a and 401b as 4 mA-20 mA analog signals. The sensed parameters and the digital data constitute the Highway Addressable Remote Transducer (HART) message in the 4 mA-20 mA analog signal. The HART modem 400 receives the 4 mA-20 mA analog signal comprising the HART message, superimposes the 4 mA-20 mA analog signal on a carrier signal, and transmits the superimposed signal as a phase modulated analog signal to a control system. In a phase shift keying technique, the phase of the carrier signal is shifted among possible phase angles, where each of the phase angles represents a predetermined number of bits. That is, in the coherent 8-ary phase shift keying (C8PSK) technique, the phase of the carrier signal is shifted among eight possible phase angles and each phase angle is represented by 3 bits. The phases of the analog signal comprising the HART message are eight possible phase angles. Similarly, the control system sends some operational instructions, for example, configuration settings, set points, etc., to the sensor devices 401a and 401b, in the form of analog signals over a pair of wires. The demodulation of the analog signals is performed by the HART modem 400 to extract the operational instructions, for example, the configuration settings, the set points, etc., from the analog signals. The operational instructions form the HART message that constitutes the analog signals. The HART message comprises four segments, namely, a preamble, a start flag, message data, and a stop flag. The preamble is a training sequence for training a demodulator of the HART modem 400. The start flag indicates beginning of a data segment of the HART message. The message data contains a normal HART frame representing the sensed parameters, the digital data, the operational instructions, etc. The stop flag indicates the end of the HART message.

The Highway Addressable Remote Transducer (HART) modem 400 disclosed herein comprises multiple analog-to-digital converters (ADCs), for example, 402, a parallel-to-serial converter 403, a gray coder 404, a coherent phase shift keying modulator 412, a digital-to-analog converter (DAC) 410, at least one microcontroller 413 configured to execute computer program instructions for operating the HART modem 400, and a non-transitory computer readable storage medium, that is, a memory unit 409 for storing a predefined gray code lookup table 407 and a pre-generated sample lookup table 408, for modulating a received analog signal. As used herein, "non-transitory computer readable storage medium" refers to all computer readable media, for example, non-volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Transmission media comprise, for example, coaxial cables, copper wire, fiber optic cables, modems, etc., including wires that constitute a system bus coupled to the microcontroller 413. The coherent phase shift keying modulator 412 comprises root raised cosine filters 412a and mixers 412b. The HART modem 400 transmits the phase modulated analog signal to the sensor device 401b via a serial peripheral interface (SPI) 411. The HART modem 400 further comprises a coherent phase shift keying demodulator 414 comprising multiple ADCs, for example, 416, a band pass filter 415, a module 417 with a high pass filter, an energy detector, an automatic gain control circuit, mixers 418, root raised cosine (RRC) filters 419, a coordinate rotation digital computer (CORDIC) 420, a decision estimator 422, an adaptive equalizer 423, a data slicer 424, and an automatic modulation classifier 421, for demodulating a received analog signal. The microcontroller 413 is operably coupled to all the components, for example, 402, 403, 404, . . . , 412, . . . , 424 of the HART modem 400.

The sensor device 401a transmits an analog signal comprising a Highway Addressable Remote Transducer (HART) message to the HART modem 400. The analog-to-digital converter (ADC) 402 of the HART modem 400 receives and converts the analog signal into digitized samples by sampling and digitizing the received analog signal at a sampling rate. The parallel-to-serial converter 403 converts the HART message in the digitized samples into serial data bit streams comprising binary information. The gray coder 404 divides each of the serial data bit streams into symbols and gray codes the symbols by performing a gray code lookup 404a in the predefined gray code lookup table 407 as disclosed in the detailed description of FIG. 6. The gray coded symbols are referred to as tribits. The microcontroller 413 executes computer program instructions defined by a tribit grouping module 405 for grouping a predetermined number of tribits and a predetermined number of the digitized samples to generate an index vector of the pre-generated sample lookup table 408 as disclosed in the detailed description of FIG. 8. The microcontroller 413 then executes computer program instructions defined by a phase modulated digital signal lookup module 406 for performing a phase modulated digital signal lookup in the pre-generated sample lookup table 408 to determine a phase modulated digital signal corresponding to the generated index vector, in the pre-generated sample lookup table 408. In an embodiment, the digital-to-analog converter (DAC) 410 of the HART modem 400 is a pulse width modulation (PWM) based DAC. The DAC 410 converts the phase modulated digital signal to a phase modulated analog signal and transmits the phase modulated analog signal to the sensor device 401b via the serial peripheral interface (SPI) 411. The phase modulated analog signal is herein referred as a "HART coherent 8-ary phase shift keying (C8PSK) analog signal". The phase modulated digital signals in the pre-generated sample lookup table 408 are generated by the coherent phase shift keying modulator 412 and the microcontroller 413 as disclosed in the detailed description of FIG. 5.

The coherent phase shift keying demodulator 414 of the Highway Addressable Remote Transducer (HART) modem 400 receives an analog signal, that is, a HART coherent 8-ary phase shift keying (C8PSK) analog signal, from the sensor device 401b. The band pass filter 415 band limits the received analog signal to filter out different frequency components in the received analog signal before mixing the received analog signal with a carrier signal. The analog-to-digital converter (ADC) 416 converts the band limited analog signal into digitized samples. In the module 417, the high pass filter is operably coupled to the energy detector and the energy detector is operably coupled to the automatic gain control circuit. The high pass filter filters low frequency interfering signals from the digitized samples. The microcontroller 413 of the HART modem 400 compares signal amplitudes of the digitized samples with predetermined threshold values using the energy detector and determines further signal processing of the digitized samples.

If further processing of the digitized samples is required, the mixers 418 and the root raised cosine filters 419 of the coherent phase shift keying demodulator 414 generate an in-phase signal and a quadrature phase signal corresponding to each of the digitized samples. The decision estimator 422 performs a coarse estimation and a fine estimation of a phase error of each of the digitized samples for determining a resultant final phase error correction as disclosed in the detailed description of FIGS. 16-18. The decision estimator 422 further estimates a timing offset in each of the subsequent digitized samples using the coordinate rotation digital computer (CORDIC) 420 as disclosed in the detailed description of FIG. 19. The decision estimator 422 determines coefficients of the adaptive equalizer 423. The adaptive equalizer 423 minimizes noise and intersymbol interference in the subsequent digitized samples and generates demodulated digitized samples. The data slicer 424 assembles a character for character generation of the demodulated digitized samples and transmits the Highway Addressable Remote Transducer (HART) message as digital data as disclosed in the detailed description of FIG. 13. The automatic modulation classifier 421 validates presence of the received analog signal in the coherent 8-ary phase shift keying (C8PSK) protocol and absence of the received analog signal in the frequency shift keying (FSK) protocol, that is, the HART FSK signal at the input of the coherent phase shift keying demodulator 414 by determining signs of an in-phase signal and a quadrature phase signal corresponding to each of the subsequent digitized samples after performing the fine estimation of the phase error of each of the digitized samples and the estimation of the timing offset in each of the subsequent digitized samples. The automatic modulation classifier 421 detects an alignment of the in-phase signals of the subsequent digitized samples. If the automatic modulation classifier 421 detects a misalignment of the in-phase signals of the subsequent digitized samples, the automatic modulation classifier 421 asserts that the received analog signal is not in the C8PSK protocol and therefore, the received analog signal is in the FSK protocol. If the HART FSK signal is present, the HART modem 400 demodulates the HART FSK signal using a FSK demodulation method implemented by an FSK demodulator.

Figure 5:
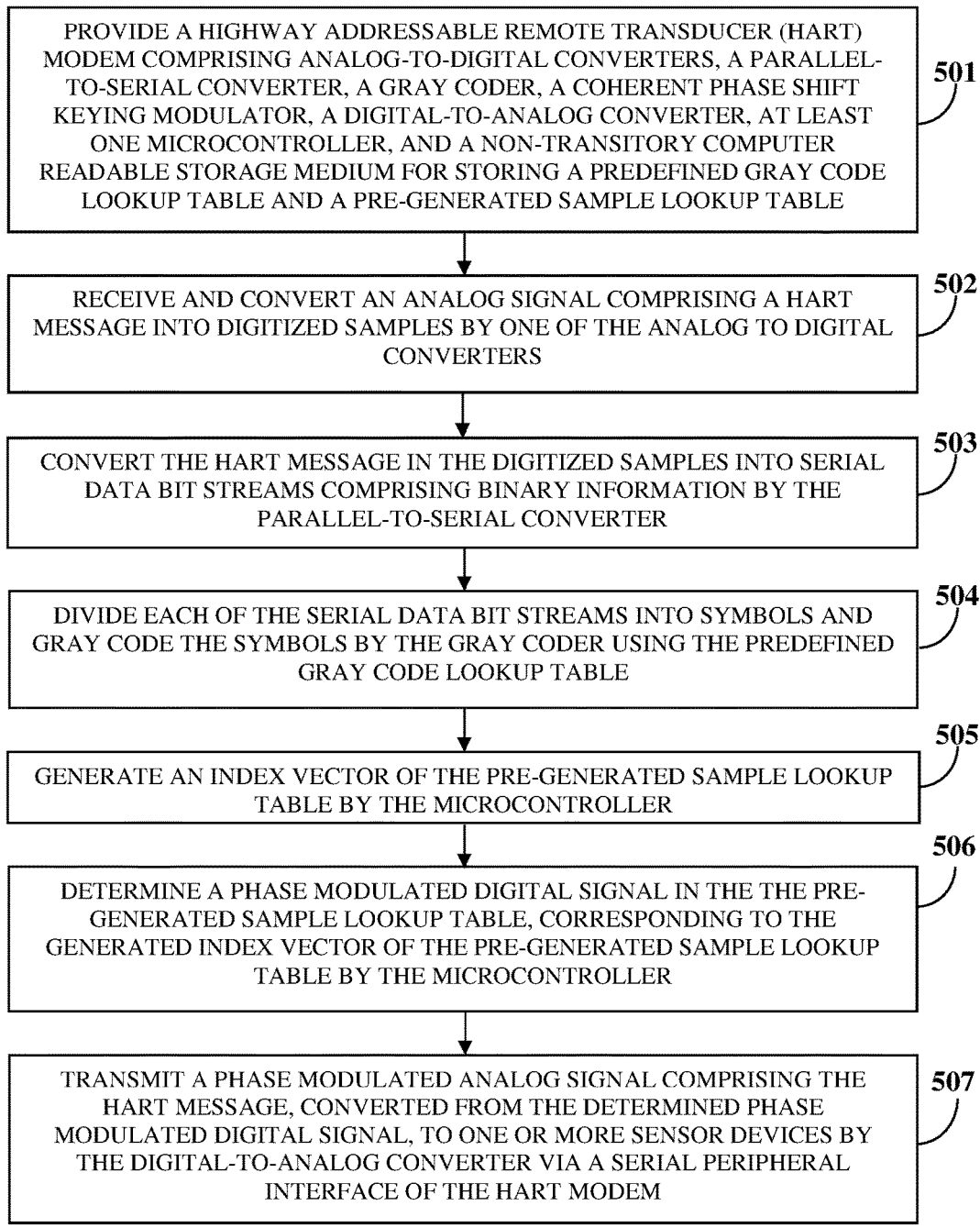
FIG. 5 illustrates a method for modulating and transmitting an analog signal comprising a Highway Addressable Remote Transducer message.

FIG. 5 illustrates a method for modulating and transmitting an analog signal comprising a Highway Addressable Remote Transducer (HART) message. The HART modem 400 comprising the analog-to-digital converters (ADCs), for example, 402, the parallel-to-serial converter 403, the gray coder 404, the coherent phase shift keying modulator 412 with the root raised cosine filters 412a and the mixers 412b, the digital-to-analog converter (DAC) 410, the microcontroller 413, the serial peripheral interface (SPI) 411, and the non-transitory computer readable storage medium such as the memory unit 409 exemplarily illustrated in FIG. 4, is provided 501. The HART modem 400 transmits the analog signal after modulation at a baud rate of 3200, that is, at 3200 symbols per second. Furthermore, the HART modem 400 uses a carrier signal of frequency equal to 3200 Hz to modulate the analog signal. The HART modem 400 receives the analog signal and modulates and transmits the received analog signal to a sensor device 401b exemplarily illustrated in FIG. 4, as a phase modulated analog signal.

The analog-to-digital converter (ADC) 402 of the Highway Addressable Remote Transducer (HART) modem 400 receives and converts 502 the analog signal comprising the HART message into a digital format or into digitized samples by sampling and digitizing the received analog signal at a sampling rate. The parallel-to-serial converter 403 of the HART modem 400 converts 503 the HART message in the digitized samples into serial data bit streams. The serial data bit streams comprise binary information. The gray coder 404 of the HART modem 400 divides 504 each of the serial data bit streams into symbols and gray codes 504 the symbols using the predefined gray code lookup table 407 exemplarily illustrated in FIG. 6. Each of the symbols comprises a predetermined number of consecutive bits in each of the serial data bit streams and represents a predetermined number of the digitized samples. For 8-ary phase shift keying, the symbols comprise three consecutive bits. The three consecutive bits are together referred to as a tribit. The left hand bit of the tribit corresponds to the first bit occurring in the serial data bit stream as the serial data bit stream enters the gray coder 404. The predetermined number of the digitized samples per symbol is 8. The gray coded symbols are encoded symbols where the adjacent symbols differ by 1 bit. According to C8PSK physical layer specifications of the HART protocol published by the HART Communication Foundation (HCF), the symbols are mapped into 8 phase angles as exemplarily illustrated in FIG. 6. The mapped phase angles have corresponding real parts and imaginary parts that are referred to as in-phase components and quadrature phase components of the symbols. In C8PSK modulation, the digital data, that is, the symbols are converted into 8 different sine waves having 8 different phases.

The microcontroller 413 and the coherent phase shift keying modulator 412 of the Highway Addressable Remote Transducer (HART) modem 400 generate phase modulated digital signals and store the phase modulated digital signals in the pre-generated sample lookup table 408 exemplarily illustrated in FIG. 4. The microcontroller 413 determines in-phase components and quadrature phase components of pre-gray coded symbols corresponding to analog signals received by the HART modem 400 by mapping the pre-gray coded symbols to predetermined phase angles in the predefined gray code lookup table 407. As used herein, "pre-gray coded symbols" refer to gray coded symbols corresponding to the analog signals with HART messages that the HART modem 400 has the capability to receive, modulate, and transmit. The predefined gray code lookup table 407 comprises gray coded symbols, the corresponding tribits, and the phase angles corresponding to the gray coded symbols as exemplarily illustrated in FIG. 6. The microcontroller 413 maps the pre-gray coded symbols to the phase angles in the predefined gray code lookup table 407 and determines the in-phase component and the quadrature phase component of each of the pre-gray coded symbols. The root raised cosine filters 412a of the coherent phase shift keying modulator 412 pulse shape the determined in-phase components and the determined quadrature phase components of the pre-gray coded symbols corresponding to the received analog signals. The mixers 412b of the coherent phase shift keying modulator 412 modulate the pulse shaped in-phase components and the pulse shaped quadrature phase components with a carrier signal for generating the phase modulated digital signals ahead of time as disclosed in the detailed description of FIG. 10. The microcontroller 413 stores the generated phase modulated digital signals in the pre-generated sample lookup table 408.

The microcontroller 413 generates 505 an index vector of the pre-generated sample lookup table 408 for indexing a phase modulated digital signal in the pre-generated sample lookup table 408 by grouping a predetermined number of the gray coded symbols and the predetermined number of the digitized samples. The predetermined number of the digitized samples is 8 to aid the root raised cosine filters 412a in pulse shaping the digitized samples. The pre-generated sample lookup table 408 comprises the phase modulated digital signals corresponding to index vectors generated by the microcontroller 413 as exemplarily illustrated in FIG. 11. The microcontroller 413 groups 3 gray coded symbols and 8 digitized samples and generates the index vector as exemplarily illustrated in FIG. 8.

The microcontroller 413 determines 506 a phase modulated digital signal in the pre-generated sample lookup table 408, corresponding to the generated index vector of the pre-generated sample lookup table 408. The pre-generated sample lookup table 408 is generated by the microcontroller 413 using the pre-gray coded symbols based on the frequency of the carrier signal being in synchronization with the baud rate of the phase modulated analog signal to be transmitted to the sensor device 401b by the Highway Addressable Remote Transducer (HART) modem 400. That is, the carrier frequency is equal to the baud rate of the HART modem 400. The index vector of the pre-generated sample lookup table 408 comprises 3n bits representing n gray coded symbols and m bits representing an index of the predetermined number of the digitized samples in each of the gray coded symbols. The values of n and m in the index vector of the pre-generated sample lookup table 408 are 3 resulting in the index vector of 12 bits indexing a phase modulated digital signal in the pre-generated sample lookup table 408. The size of the pre-generated sample lookup table 408 is base 2 raised to an exponent of 12, that is, $2^{12}=4096$ bytes. With the pre-generated sample lookup table 408 stored in the memory unit 409 of the HART modem 400, the HART modem 400 reduces power intensive computations in phase modulation of the received analog signal performed by the coherent phase shift keying modulator 412 in real time as the pre-generated sample lookup table 408 is generated ahead of time.

The digital-to-analog converter (DAC) 410 transmits 507 the phase modulated analog signal comprising the Highway Addressable Remote Transducer (HART) message, converted from the determined phase modulated digital signal, to the sensor devices 401b via the serial peripheral interface (SPI) 411. In an embodiment, if more precision is required, a pulse width modulation (PWM) based DAC 410 is used for converting the determined phase modulated digital signal to a phase modulated analog signal for further transmission. A sample rate of the transmitted phase modulated analog signal is 25600 hertz (Hz). That is, the HART modem 400 transmits the phase modulated analog signal at a sample rate=baud rate*number of samples per baud=3200*8=25600

Hz. In an embodiment, the sample rate of the transmitted phase modulated analog signal is 12800 Hz.

Figures 6, 7:
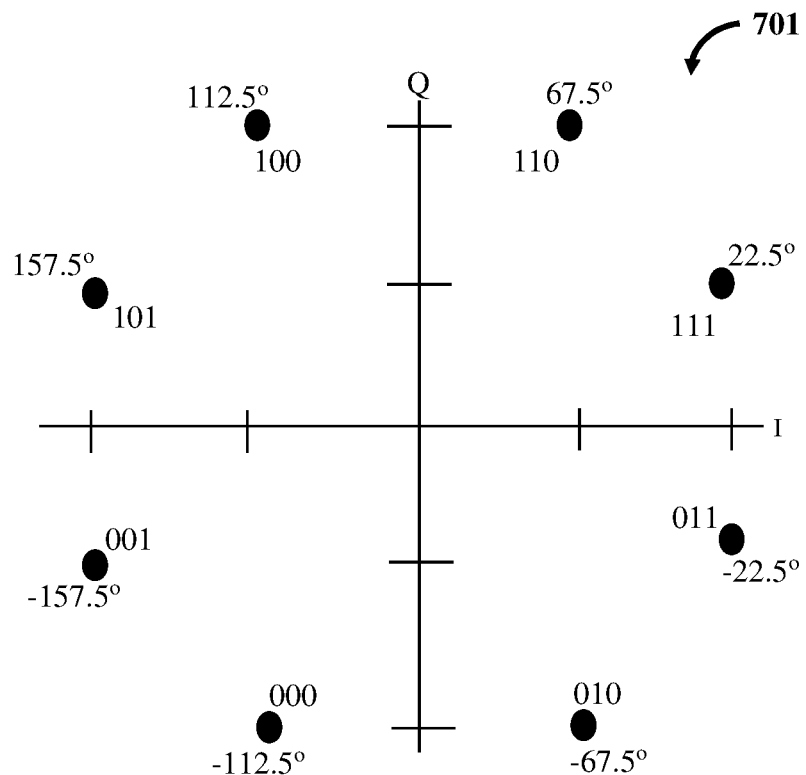
FIG. 6 exemplarily illustrates a predefined gray code lookup table of the Highway Addressable Remote Transducer modem.
FIG. 7 exemplarily illustrates a constellation diagram corresponding to the predefined gray code lookup table shown in FIG. 6.

FIG. 6 exemplarily illustrates the predefined gray code lookup table 407 of the Highway Addressable Remote Transducer (HART) modem 400 exemplarily illustrated in FIG. 4. Coherent 8-ary phase shift keying (C8PSK) in the HART modem 400 comprises converting a serial data bit stream obtained from the digitized samples into 8 different sine waves having different phase angles. The 8 phase angles have a difference of 45° between them. The predefined gray code lookup table 407 comprises symbols formed by the gray coder 404 by dividing the serial data bit stream and the 8 phase angles corresponding to the symbols. The gray coder 404 gray codes the symbols to generate gray coded symbols. The gray coded symbols have corresponding 8 phase angles. Each of the 8 phase angles corresponds to an in-phase component and a quadrature phase component of a gray coded symbol. The in-phase component of the gray coded symbol corresponds to a cosine component of the corresponding phase angle, and the quadrature phase component of the gray coded symbol corresponds to a sine component of the corresponding phase angle. Consider an example where a symbol 3 comprising three consecutive bits from the most significant bit (MSB) as 0, 1, 1 is received by the gray coder 404 of the HART modem 400. The gray coder 404 gray codes the symbol 3 and generates a gray coded symbol 2 comprising three consecutive bits from the MSB as 0, 1, 0. As exemplarily illustrated in FIG. 6, the phase angle corresponding to the gray coded symbol 2 in the predefined gray code lookup table 407 is −67.5°. The microcontroller 413 of the HART modem 400 exemplarily illustrated in FIG. 4, determines an in-phase component and a quadrature phase component of the gray coded symbol 2 as cos (−67.5°) and sin (−67.5°) respectively.

FIG. 7 exemplarily illustrates a constellation diagram 701 corresponding to the predefined gray code lookup table 407 shown in FIG. 6. The constellation diagram 701 is a two-dimensional XY-plane scatter diagram in a complex plane of the gray coded symbols. The gray coded symbols are represented by dots as complex numbers in the complex plane. As exemplarily illustrated in FIG. 7, the X-axis is a real axis and the Y-axis is an imaginary axis of the complex plane. In the complex plane, herein referred to as an "I/Q plane", the real axis is referred to as an in-phase axis (I-axis) and the imaginary axis is referred to as a quadrature phase axis (Q-axis). The 8 gray coded symbols and the phase angles are represented in the constellation diagram 701 as exemplarily illustrated in FIG. 7. The distance between the representation of the gray coded symbol and the origin in the I/Q plane defines the amplitude of the received analog signal corresponding to the gray coded symbol, and the angle between the representation of the gray coded symbol and the I-axis in the I/Q plane defines the phase angle corresponding to the gray coded symbol. Therefore, the in-phase component of the gray coded symbol is defined by the cosine component of the phase angle and the quadrature phase component of the gray coded symbol is defined by the sine component of the phase angle as disclosed in the detailed description of FIG. 6. The I/Q plane is divided into four quadrants. The gray coded symbols in the first quadrant have positive signs for both their in-phase components and their quadrature phase components. The gray coded symbols in the second quadrant have a negative sign for their in-phase components and a positive sign for their quadrature phase components. The gray coded symbols in the third quadrant have negative signs for both their in-phase components and their quadrature phase components. The gray coded symbols in the fourth quadrant have a positive sign for their in-phase components and a negative sign for their quadrature phase components. Consider an example where a gray coded symbol 5 comprising 1, 0, 1 as three bits with a phase angle of +157.5°. As exemplarily illustrated in FIG. 7, the gray coded symbol 5 lies the second quadrant of the I/Q plane and has a negative sign for its in-phase component and a positive sign for its quadrature phase component.

Figure 8:
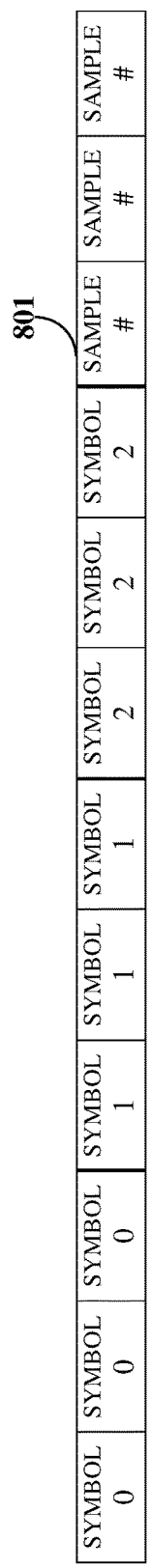
FIG. 8 exemplarily illustrates an index vector of a pre-generated sample lookup table.

FIG. 8 exemplarily illustrates an index vector 801 of the pre-generated sample lookup table 408 generated by the microcontroller 413 of the Highway Addressable Remote Transducer (HART) modem 400 exemplarily illustrated in FIG. 4. The microcontroller 413 groups a predetermined number of the gray coded symbols, that is, 3 gray coded symbols, and a predetermined number of the digitized samples, that is, 8 digitized samples of a received analog signal to form the index vector 801. The size of the index vector 801 is 12 bits with 9 bits representing the 3 gray coded symbols and 3 bits representing the 8 digitized samples as exemplarily illustrated in FIG. 8. The index vector 801 is used for indexing a phase modulated digital signal in the pre-generated sample lookup table 408. The bits of the first gray coded symbol, symbol 0, are in positions 9, 10, and 11 of the index vector 801, the bits of the second gray coded symbol, symbol 1, are in positions 6, 7, and 8 of the index vector 801, and the bits of the third gray coded symbol, symbol 2, are in positions 3, 4, and 5 of the index vector 801. The bits in the positions 0, 1, and 2 of the index vector 801 indicate an index of the 8 digitized samples per gray coded symbol corresponding to which a phase modulated digital signal is generated and stored in the pre-generated sample lookup table 408. The index of the 8 digitized samples per gray coded symbol starts from 0 and increments up to 7.

Each of the 8 gray coded symbols can be represented by three consecutive bits and each gray coded symbol has 8 digitized samples. Thus, the index vector 801 of 12 bits can index 8*8*8*8=4096 digitized samples in 512 phase modulated digital signals in the pre-generated sample lookup table 408. That is, the index vector 801 can index 512 different coherent 8-ary phase shift keying (C8PSK) modulated waveforms, that is, the phase modulated digital signals with 8 digitized samples each. The index vector 801 points to a position in the pre-generated sample lookup table 408 where the phase modulated digital signal corresponding to a combination of the 3 gray coded symbols and the 3 bits representing an index of the 8 digitized samples is located. The pre-generated sample lookup table 408 comprises the 512 C8PSK modulated waveforms with the 8 digitized samples each. Prior to generation of the index vector 801, the phase modulated digital signals, that is, the different C8PSK modulated waveforms are assembled in the pre-generated sample lookup table 408 by the microcontroller 413 and the coherent phase shift keying modulator 412 exemplarily illustrated in FIG. 4. With the pre-generated sample lookup table 408, the C8PSK modulated output, that is, the phase modulated digital signals are determined with a substantially less number of instructions.

Figure 9A:
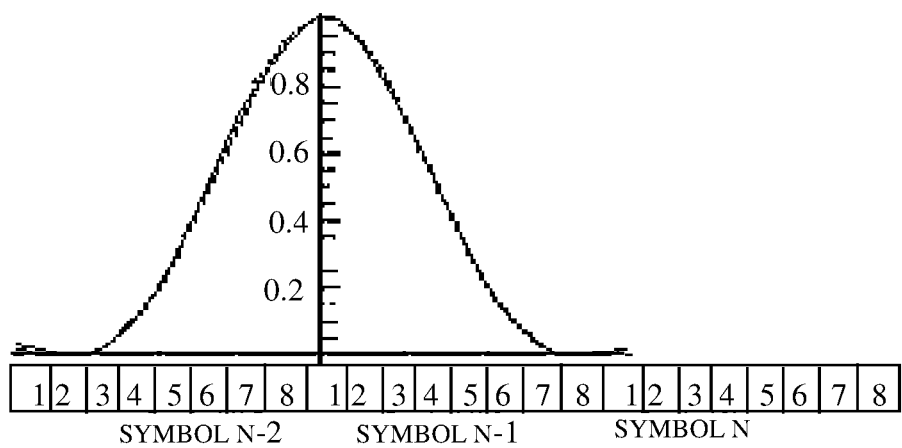
FIGS. 9A-9C exemplarily illustrate impulse responses of a root raised cosine filter of a coherent phase shift keying modulator of the Highway Addressable Remote Transducer modem.
Figure 9B:
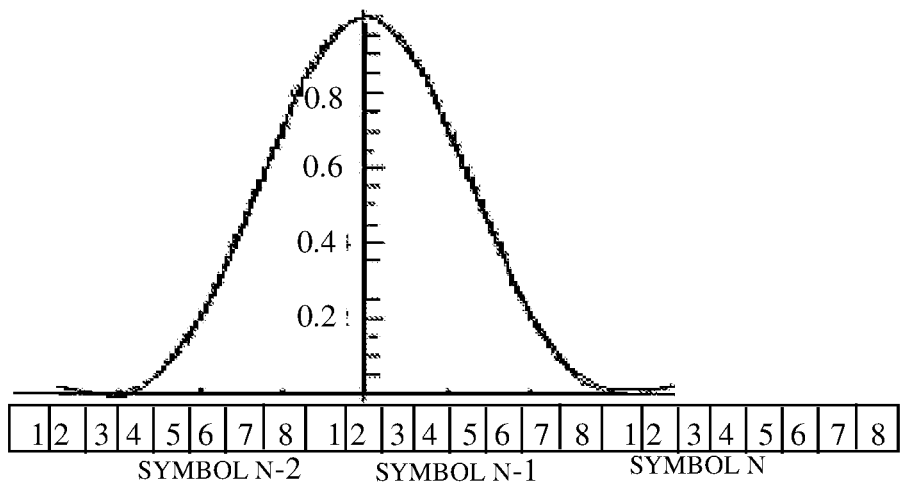
Figure 9C:
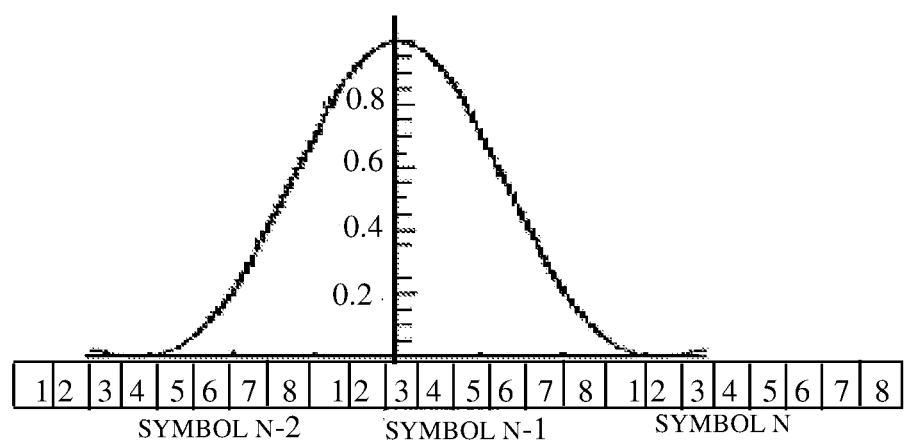

FIGS. 9A-9C exemplarily illustrate impulse responses of one of the root raised cosine filters 412a of the coherent phase shift keying modulator 412 of the Highway Addressable Remote Transducer (HART) modem 400 exemplarily illustrated in FIG. 4. Each of the root raised cosine filters 412a pulse shapes an in-phase component and a quadrature phase component of each of the pre-gray coded symbols. The impulse response of one of the root raised cosine filters 412a is the output of that root raised cosine filter when presented with an impulse as an input. The root raised cosine filters 412a are assumed to be 2 bauds or symbols and 1 sample long. Thus, the root raised cosine filters 412a are 3 bauds in filter length, that is, the root raised cosine filters 412a have 17 taps and operate at a sample rate of 25600 Hz. In the impulse response exemplarily illustrated in FIGS. 9A-9C, the Y-axis represents output of one of the root raised cosine filters 412a for pulse shaping, for example, the in-phase component of each of the pre-gray coded symbols and the X-axis represents the 8 digitized samples per pre-gray coded symbol. Each number on the X-axis indicates a position or an index of a digitized sample in the pre-gray coded symbol whose in-phase component or quadrature phase component is input to one of the root raised cosine filters 412a. When moving from one digitized sample to the next digitized sample of the baud or the pre-gray coded symbol in one of the root raised cosine filters 412a, the I/Q waveform, that is, the impulse response shifts to the next index of the digitized sample in the pre-gray coded symbol. The impulse response shifts from a position exemplarily illustrated in FIG. 9A, to a position exemplarily illustrated in FIG. 9B, as a second digitized sample in the pre-gray coded symbol N-1 is being modulated. Similarly, the impulse response shifts from the position exemplarily illustrated in FIG. 9B, to a position exemplarily illustrated in FIG. 9C, as a third digitized sample in the pre-gray coded symbol N-1 is being modulated. After the eighth digitized sample in the pre-gray coded symbol N-1 is modulated, the digitized samples in the pre-gray coded symbol N-2 move to the next digitized sample positions in the pre-gray coded symbol N-1. The root raised cosine filters 412a generate a pulse shaped in-phase component and a pulse shaped quadrature phase component for each of the 8 digitized samples of a pre-gray coded symbol. The mixers 412b of the coherent phase shift keying modulator 412 exemplarily illustrated in FIG. 4, generate an in-phase (I) signal and a quadrature phase (Q) signal by mixing the pulse shaped in-phase component and the pulse shaped quadrature phase component with a cosine component and a sine component of the carrier signal respectively, for each of the 8 digitized samples of the pre-gray coded symbol. To obtain the pulse shaped in-phase component and the pulse shaped quadrature phase component for each of the 8 digitized samples per pre-gray coded symbol, the impulse responses of the root raised cosine filters 412a are slid over the 8 digitized samples per pre-gray coded symbol as exemplarily illustrated in FIGS. 9A-9C.

Figure 10:
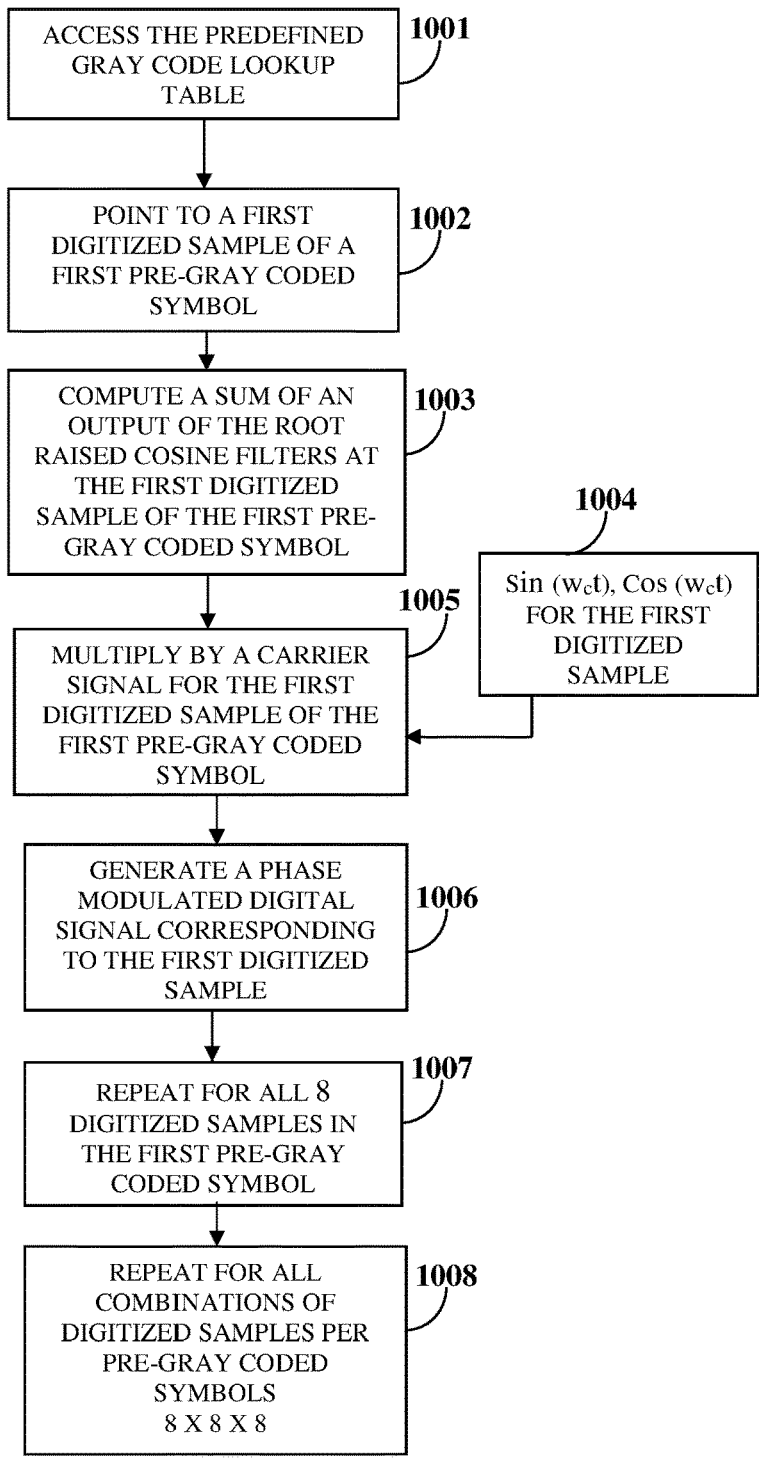
FIG. 10 exemplarily illustrates a flow chart comprising the steps performed by a microcontroller and the coherent phase shift keying modulator of the Highway Addressable Remote Transducer modem for generating a pre-generated sample lookup table.
Figure 11:
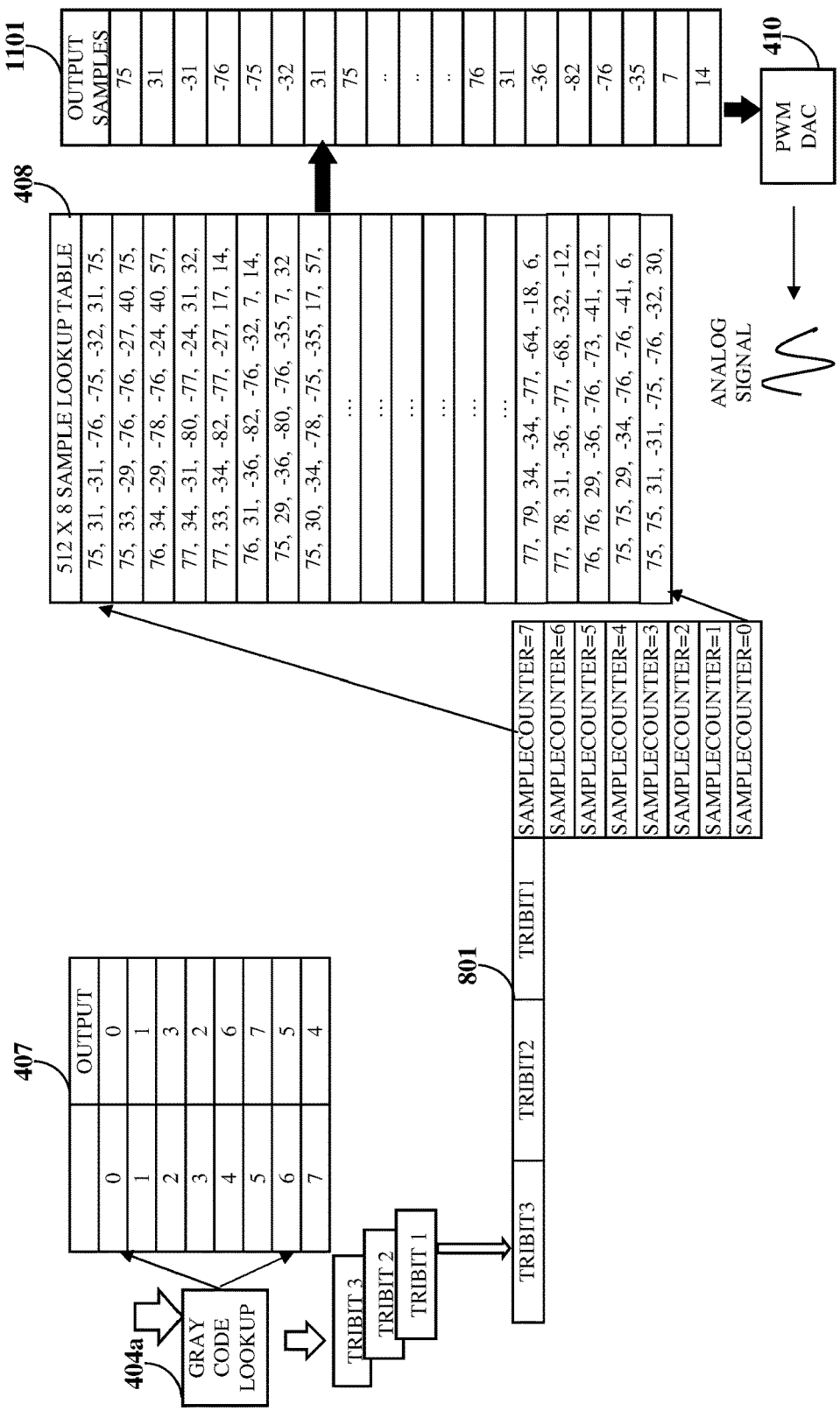
FIG. 11 exemplarily illustrates a schematic diagram showing modulation and transmission of an analog signal comprising a Highway Addressable Remote Transducer message performed by the Highway Addressable Remote Transducer modem.

FIG. 10 exemplarily illustrates a flow chart comprising the steps performed by the microcontroller 413 and the coherent phase shift keying modulator 412 of the Highway Addressable Remote Transducer (HART) modem 400 exemplarily illustrated in FIG. 4, for generating a pre-generated sample lookup table 408 exemplarily illustrated in FIG. 4 and FIG. 11. The pre-generated sample lookup table 408 is generated in non-real time for use in real time by the microcontroller 413. The pre-generated sample lookup table 408 in real time replaces the coherent phase shift keying modulator 412. The microcontroller 413 accesses 1001 the predefined gray code lookup table 407 and maps pre-gray coded symbols to predetermined phase angles in the predefined gray code lookup table 407. For the pre-gray coded symbols and the 8 digitized samples per pre-gray coded symbol, the root raised cosine filters 412a of the coherent phase shift keying modulator 412 exemplarily illustrated in FIG. 4, determine the impulse responses as exemplarily illustrated in FIGS. 9A-9C. With 17 taps, the root raised cosine filters 412a span 3 bauds or symbols of the received analog signal. The carrier frequency being in synchronization with the baud rate of the analog signal, that is, the HART coherent 8-ary phase shift keying (C8PSK) analog signal to be transmitted by the HART modem 400, allows the microcontroller 413 to calculate the outputs of the root raised cosine filters 412a for the determined in-phase component and the determined quadrature phase component for each of the digitized samples in each baud corresponding to the predetermined phase angle in the predefined gray code lookup table 407. The sum of the output of the root raised cosine filters 412a of the 3 bauds, that is, the pre-gray coded symbols N-2, N-1, and N is calculated and then multiplied with a carrier signal in the coherent phase shift keying modulator 412. The output of the root raised cosine filters 412a is a product and a summation of the determined in-phase components and the determined quadrature phase components of the pre-gray coded symbols x[k-i] and the filter coefficients $a_i$ given by the expression below:

$$Y[k] = \Sigma^{17}_{i=0} a_i x[k-i]$$

The filter coefficients $a_i$ are derived from the impulse responses of the root raised cosine filters 412a. The microcontroller 413 points 1002 to a first digitized sample of a first pre-gray coded symbol N. The output of the root raised cosine filters 412a at the first digitized sample of the first pre-gray coded symbol N is a product of an in-phase component and a quadrature phase component at the first digitized sample of the pre-gray coded symbol N and impulse responses of the root raised cosine filters 412a at the first digitized sample of the pre-gray coded symbol N. The microcontroller 413 computes 1003 a sum of the output of the root raised cosine filters 412a at the first digitized sample of the first pre-gray coded symbol N. The output of the root raised cosine filters 412a involves all 8 digitized samples of the pre-gray coded symbol N-2, all 8 digitized samples of the pre-gray coded symbol N-1, and the first digitized sample of the gray coded symbol N. For the second digitized sample of the pre-gray coded symbol N, the impulse response is shifted to the right by 1 position as exemplarily illustrated in FIG. 9B. Then, the output of the root raised cosine filters 412a involves 7 digitized samples of the pre-gray coded symbol N-2, all 8 digitized samples of the pre-gray coded symbol N-1, and the second digitized sample from the pre-gray coded symbol N. For the first digitized sample of the first pre-gray coded symbol N, the coherent phase shift keying modulator 412 multiplies 1005 the pulse shaped in-phase component and the pulse shaped quadrature phase component with a cosine component $\cos(w_c t)$ and a sine component $\sin(w_c t)$ of the carrier signal 1004 respectively. The coherent phase shift keying modulator 412 generates 1006 a phase modulated digital signal corresponding to the first digitized sample of the first pre-gray coded symbol N using the mixers 412b of the coherent phase shift keying modulator 412 exemplarily illustrated in FIG. 4.

The microcontroller 413 and the coherent phase shift keying modulator 412 repeat 1007 the steps 1002 to 1006 for all the 8 digitized samples of the pre-gray coded symbol N. The microcontroller 413 and the coherent phase shift keying modulator 412 repeat 1008 the step 1007 for all combinations of the pre-gray coded symbols and the digitized samples per pre-gray coded symbol corresponding to analog signals received by the Highway Addressable Remote Transducer (HART) modem 400, resulting in a pre-generated sample lookup table 408 with phase modulated digital signals. The microcontroller 413 of the HART modem 400 uses fewer additions and subtractions in generating the pre-generated sample lookup table 408 and minimizes the number of additions and multiplications performed in real time. The operations of additions and subtractions are performed in the raised cosine filters 412a and the mixers 412b in the coherent phase shift keying modulator 412. The size of the pre-generated sample lookup table 408 is 8*8*8*8=512*8=4096 bytes. The pre-generated sample lookup table 408 has 4096 table values, that is, 512 phase modulated digital signals with 8 digitized samples each. The microcontroller 413 pre-calculates these different phase modulated digital signals and stores the phase modulated digital signals in the memory unit 409 of the HART modem 400 exemplarily illustrated in FIG. 4, in the form of the pre-generated sample lookup table 408. In an embodiment, the HART modem 400 stores the pre-generated sample lookup table 408 in a non-volatile memory of the microcontroller 413. In an embodiment, the pre-generated sample lookup table 408 is generated by a secondary microcontroller apart from the microcontroller 413 of the HART modem 400.

The Highway Addressable Remote Transducer (HART) modem 400 generates the pre-generated sample lookup table 408 since the frequency of the carrier signal is equal to the baud rate of the phase modulated analog signal. Thus, the carrier signal is in exact phase at the end of each pre-gray coded symbol. The number of computing cycles required by the coherent phase shift keying modulator 412 is substantially lowered by using the pre-generated sample lookup table 408. In an embodiment, using a microcontroller MSP430 of Texas Instruments Inc., the pre-generated sample lookup table 408 is generated in less than 1 megahertz (MHz) of computing cycles. Due to the less number of computing cycles, significant power and cost savings are achieved in the HART modem 400.

A code snippet, for example, in a C programming language, for generating the 512 coherent 8-ary phase shift keying (C8PSK) waveforms, that is, the phase modulated digital signals in the pre-generated sample lookup table 408 by the microcontroller 413 and the coherent phase shift keying modulator 412 of the Highway Addressable Remote Transducer (HART) modem 400 is disclosed below:

```
for(symCount=0;symCount < 512;symCount++)
{
   i3=itable[(symCount & 0x1c0) >> 6];
   q3= qtable[(symCount & 0x1c0) >> 6];
   i2=itable[(symCount & 0x38) >> 3];
   q2= qtable[(symCount & 0x38) >> 3];
   i1=itable[(symCount & 0x07)];
   q1= qtable[(symCount & 0x07)];
   for(tcount=0;tcount<8;tcount++)
   {
      modIout=0;
      modQout=0;
      for(lcount=0;lcount <= tcount; lcount++) // Symbol N-2
      {
         modIout += i1 * filter_taps[lcount];
         modQout += q1 * filter_taps[lcount];
      }
      for(lcount=0;lcount<8;lcount++) // Symbol N-1
      {
         modIout += i2 * filter_taps[lcount + tcount + 1];
         modQout += q2 * filter_taps[lcount + tcount + 1];
      }
      for(lcount=0; (lcount+tcount) < 8;lcount++) // Symbol N
      {
         modIout += i3 * filter_taps[lcount + tcount + 9];
         modQout += q3 * filter_taps[lcount + tcount + 9];
      }
      modIout >>= 9;              // output scaling
      modQout >>= 9;
      switch(tcount)
      {
      case 0:
         tableOut[0]=modIout * 128; // sin 0, cos0
         break;
      case 1:
         tableOut[1] = modIout * 91 - modeQout * 91;// sin45, cos45
         break;
      case 2:
         tableOut[2] = -modQout * 128;       // sin 90, cos90
         break;
      case 3:
         tableOut[3] = - modIout* 91-modQout * 91; //sin135,cos135
         break;
      case 4:
         tableOut[4] = -modIout * 128 ; // cos180, sin180
         break;
      case 5:
         tableOut[5] = - modIout * 91 + modQout*91;//cos225, sin225
         break;
      case 6:
         tableOut[6] = modQout * 128; // cos127, sin270
         break;
      case 7:
         tableOut[7] = modIout *91 + modQout * 91;//sin315, cos315
         break;
      }
   }
}
```

FIG. 11 exemplarily illustrates a schematic diagram showing modulation and transmission of an analog signal comprising a Highway Addressable Remote Transducer (HART) message performed by the HART modem 400 exemplarily illustrated in FIG. 4. The gray coder 404 of the HART modem 400 exemplarily illustrated in FIG. 4, receives a serial data bit stream from the parallel-to-serial converter 403 exemplarily illustrated in FIG. 4. The gray coder 404 divides the received serial data bit stream into symbols with consecutive bits, gray codes the symbols, performs a gray code lookup 404a in the predefined gray code lookup table 407, and maps the gray coded symbols and corresponding phase angles in the predefined gray code lookup table 407. The gray coded symbols are referred to as tribits. As exemplarily illustrated in FIG. 11, the microcontroller 413 executes the tribit grouping module 405 exemplarily illustrated in FIG. 4, for grouping the tribits, for example, tribit 1, tribit 2, and tribit 3 to generate an index vector 801 of the pre-generated sample lookup table 408. The index vector 801 further comprises 3 bits representing an index of 8 digitized samples of the received analog signal per gray coded symbol. The microcontroller 413 and the coherent phase shift keying modulator 412 exemplarily illustrated in FIG. 4, generate the pre-generated sample lookup table 408 using the pre-gray coded symbols as disclosed in the detailed description of FIG. 10. The microcontroller 413 determines an in-phase component and a quadrature phase component of each of the pre-gray coded symbols by mapping the pre-gray coded symbols to the 8 phase angles in the predefined gray code lookup table 407 for generating the pre-generated sample lookup table 408 with phase modulated digital signals. The pre-generated sample lookup table 408 is of the size 8*8*8*8=512*8=4096 bytes. The pre-generated sample lookup table 408 comprises phase modulated digital signals corresponding to each of the generated index vector 801. Consider an example where tribit 1 is 1, tribit 2 is 0, and tribit 3 is 0. That is, the tribit 1 is 001, tribit 2 is 000, and tribit 3 is 000. The microcontroller 413 generates an index vector 801 with bits of tribit 3 in positions 9, 10, and 11 of the index vector 801, with bits of tribit 2 in positions 6, 7, and 8 of the index vector 801, and with bits of tribit 1 are in positions 3, 4, and 5 of the index vector 801. The bits in the positions 0, 1, and 2 of the index vector 801 indicate an index of the 8 digitized samples of the received analog signal. That is, the bits in the positions 0, 1, and 2 indicate a digitized sample counter that increments from 0 to 7. The generated index vector 801 for a second digitized sample is 000 000 001 010. For the 8 digitized samples, the value of the generated index vector 801 is 1. The first row of the pre-generated sample lookup table 408 is indexed by the index vector 801 of value 0. The microcontroller 413 selects a second row of the pre-generated sample lookup table 408 as the phase modulated digital signal that corresponds to the generated index vector 801. The microcontroller 413 selects the 8 consecutive digitized samples in the second row of the pre-generated sample lookup table 408 as a phase modulated digital signal corresponding to the generated index vector 801. The 8 consecutive digitized samples 75, 33, −29, −76, −76, −27, 40, 75 form a phase modulated digital signal. The phase modulated digital signal corresponds to the 3 tribits in the serial data bit stream. The phase modulated digital signal is a part of output samples 1101 generated by the HART modem 400 on coherent 8-ary phase shift keying (C8PSK) modulation of the received analog signal. The pulse width modulation (PWM) based digital-to-analog converter (DAC) 410 of the HART modem 400 exemplarily illustrated in FIG. 4, transmits a phase modulated analog signal comprising the HART message that is converted from the output samples 1101 comprising the phase modulated digital signal, to a sensor device 401b via the serial peripheral interface (SPI) 411 of the HART modem 400 exemplarily illustrated in FIG. 4.

Figure 12:
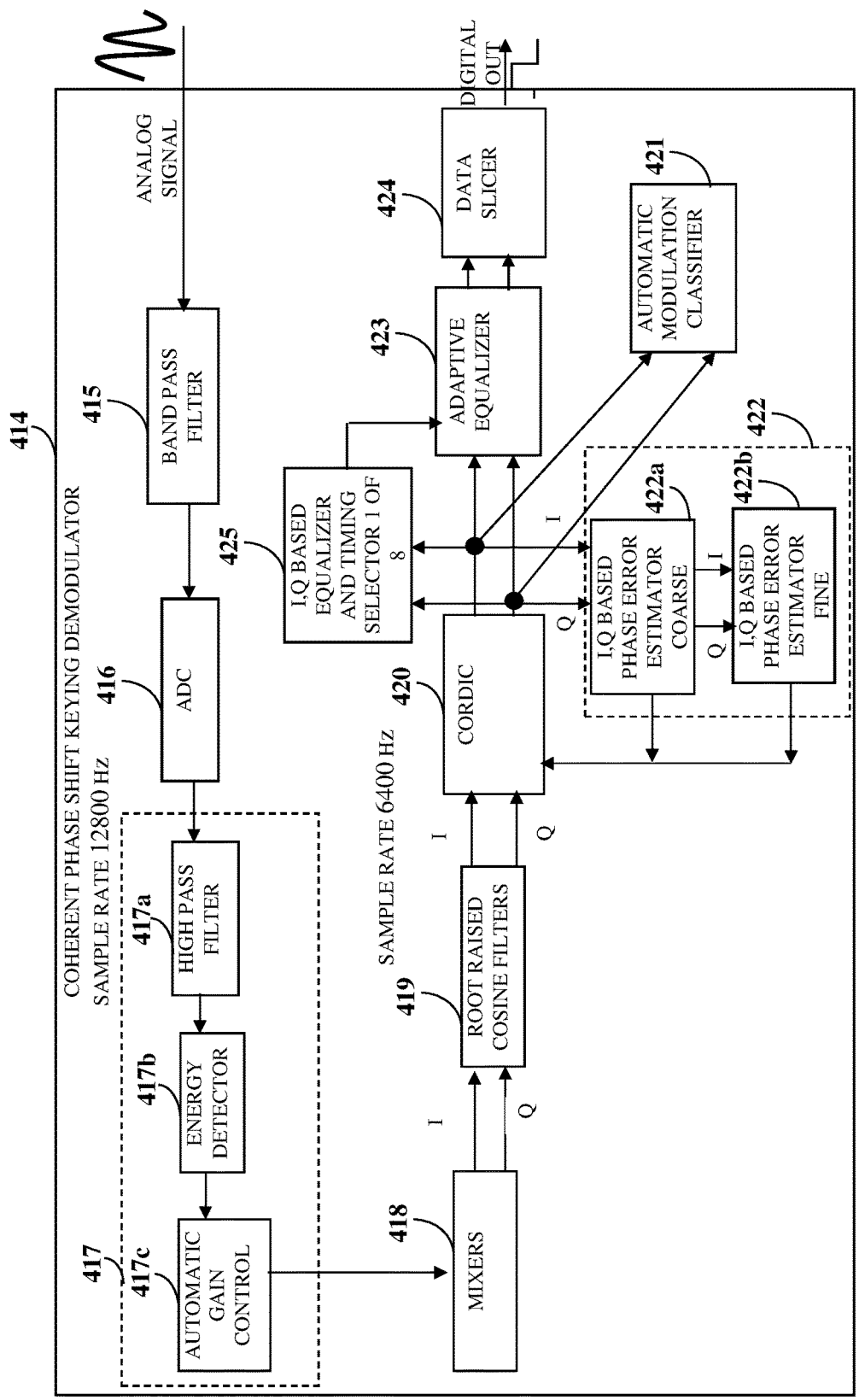
FIG. 12 exemplarily illustrates a block diagram of a coherent phase shift keying demodulator of the Highway Addressable Remote Transducer modem for demodulating an analog signal comprising a Highway Addressable Remote Transducer message.

FIG. 12 exemplarily illustrates a block diagram of the coherent phase shift keying demodulator 414 of the Highway Addressable Remote Transducer (HART) modem 400 exemplarily illustrated in FIG. 4, for demodulating an analog signal comprising a HART message. The preamble in the HART message of the received analog signal comprises a train of 40 symbols or bauds. The preamble is a training sequence of the coherent phase shift keying demodulator 414 of the HART modem 400. The training sequence is used for computing gain of the automatic gain control circuit 417c of the coherent phase shift keying demodulator 414, for timing synchronization, and for equalizer convergence. The timing synchronization comprises estimation of timing offsets in the demodulation of the received analog signal and correction of the estimated timing offsets by the decision estimator 422 of the coherent phase shift keying demodulator 414. The training sequence initializes coefficients of the adaptive equalizer 423 to enable faster convergence of the adaptive equalizer 423 in reducing channel distortions in the HART modem 400.

As exemplarily illustrated in FIG. 12, the band pass filter 415 of the coherent phase shift keying demodulator 414 band limits the received analog signal, that is, the Highway Addressable Remote Transducer (HART) coherent 8-ary phase shift keying (C8PSK) signal, to filter out different frequency components in the received analog signal before mixing the received analog signal with a carrier signal. The band pass filter 415 is also referred as a pre-selection filter. The analog-to-digital converter (ADC) 416 of the coherent phase shift keying demodulator 414 converts the band pass filtered analog signal into digitized samples. The ADC 416 passes the digitized samples to the module 417 comprising the high pass filter 417a, the energy detector 417b, and the automatic gain control circuit 417c. The sampling rate of the ADC 416 is 12800 hertz (Hz). Thus, the sample rate of the digitized samples is 12800 Hz. The high pass filter 417a removes low frequency interference components in the digitized samples and feeds processed digitized samples to the energy detector 417b. The energy detector 417b is operably coupled to the high pass filter 417a. The energy detector 417b detects a sufficient signal level, that is, an amplitude of the processed digitized samples and proceeds for further processing of the processed digitized samples. The energy detector 417b dynamically changes a clock of the microcontroller 413 exemplarily illustrated in FIG. 4, as the processing demand of the HART modem 400 increases. The energy detector 417b passes the processed digitized samples to the automatic gain control circuit 417c.

The automatic gain control circuit 417c provides the processed digitized samples with a controlled signal amplitude for the processed digitized samples with varying amplitudes. The automatic gain control circuit 417c passes the amplitude adjusted digitized samples to the mixers 418. The mixers 418 use a cosine component and a sine component of a carrier signal to generate an in-phase component and a quadrature phase component respectively, of each of the amplitude adjusted digitized samples and unwanted high frequency components. The root raised cosine filters 419 generate an in-phase (I) signal and a quadrature phase (Q) signal corresponding to each of the amplitude adjusted digitized samples by pulse shaping and low pass filtering the in-phase component, the quadrature phase component, and the unwanted high frequency components. The in-phase (I) signal and the quadrature phase (Q) signal are input to the coordinate rotation digital computer (CORDIC) 420 that computes trigonometric functions, for example, a tangent function for phase error estimation and timing estimation of the processed digitized samples.

The decision estimator 422 of the coherent phase shift keying demodulator 414 comprises an in-phase (I) signal, quadrature phase (Q) signal based coarse phase error estimator 422a and an I, Q based fine phase error estimator 422b that perform a coarse phase error estimation and a fine phase error estimation respectively, using the generated I signal and the generated Q signal. The coherent phase shift keying demodulator 414 further comprises an I, Q based equalizer and timing selector 425 for selecting coefficients of an equalizer and determining a timing offset in subsequent processed digitized samples. The phase error estimates, the selected coefficients of the equalizer, and the selected timing offsets are passed to the adaptive equalizer 423 along with the I signal and the Q signal corresponding to each of the processed digitized samples. The adaptive equalizer 423 compensates for channel distortions in the I signal and the Q signal in the communication between the sensor devices 401a and 401b and the Highway Addressable Remote Transducer (HART) modem 400 exemplarily illustrated in FIG. 4, for obtaining demodulated digitized samples. The HART modem 400 is backward compatible to demodulate a received analog signal in the frequency shift keying (FSK) protocol. The automatic modulation classifier 421 exemplarily illustrated in FIG. 4, classifies the received analog signal to be in the FSK protocol or the coherent 8-ary phase shift keying (C8PSK) protocol by examining patterns in the I signal and the Q signal corresponding to each of the subsequent processed digitized samples after determining phase error estimates of each of the processed digitized samples and timing offsets in each of the subsequent processed digitized samples as disclosed in the detailed description of FIG. 13. The data slicer 424 performs conversion of the received and demodulated digitized samples, that are, I samples and Q samples, into digitized 1s and 0s to assemble a character as disclosed in the detailed description of FIG. 13.

Figure 13:
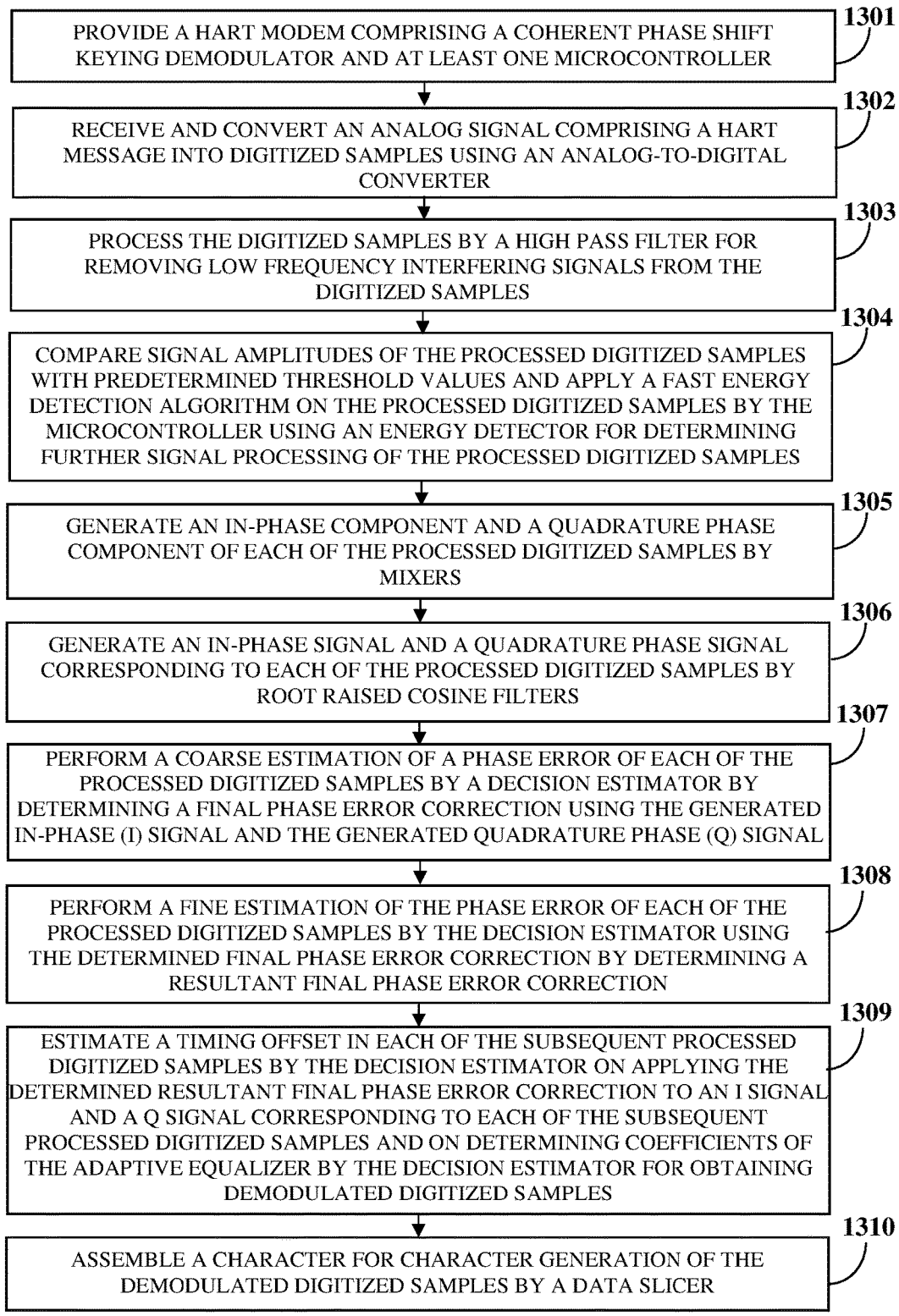
FIG. 13 illustrates a method for demodulating an analog signal comprising a Highway Addressable Remote Transducer message.

FIG. 13 illustrates a method for demodulating an analog signal comprising a Highway Addressable Remote Transducer (HART) message. In the method disclosed herein, the HART modem 400 comprising the coherent phase shift keying demodulator 414 and at least one microcontroller 413 exemplarily illustrated in FIG. 4 and FIG. 12, is provided 1301. The coherent phase shift keying demodulator 414 comprises the band pass filter 415, the analog-to-digital converter (ADC) 416, the high pass filter 417a, the energy detector 417b, the automatic gain control circuit 417c, the mixers 418, the root raised cosine filters 419, the coordinate rotation digital computer (CORDIC) 420, the decision estimator 422, the adaptive equalizer 423, the data slicer 424, and the automatic modulation classifier 421 exemplarily illustrated in FIG. 4 and FIG. 12, for demodulating the received analog signal as disclosed in the detailed description of FIG. 4 and FIG. 12.

The analog-to-digital converter (ADC) 416 of the coherent phase shift keying demodulator 414 receives and converts 1302 the analog signal comprising the Highway Addressable Remote Transducer (HART) message into digitized samples by sampling and digitizing the received analog signal at a sampling rate. The ADC 416 performs sampling of the received analog signal at 4 times the baud rate of a received analog signal, that is, at 4*3200=12800 Hz. The high pass filter 417a of the coherent phase shift keying demodulator 414 processes 1303 the digitized samples for removing low frequency interfering signals from the digitized samples. The microcontroller 413 of the HART modem 400 compares 1304 signal amplitudes of the processed digitized samples with predetermined threshold values and applies 1304 a fast energy detection algorithm on the processed digitized samples using the energy detector 417b of the coherent phase shift keying demodulator 414 for determining further signal processing of the processed digitized samples. The fast energy detection algorithm is an up down counting algorithm for determining when further processing of the processed digitized samples is required. The energy detector 417b reduces a clock speed of the microcontroller 413 to a predetermined low frequency value when sufficient energy is not detected in the processed digitized samples during the comparison. The predetermined low frequency value is, for example, 1 MHz. The energy detector 417b increases the clock speed of the microcontroller 413 of the HART modem 400 to a predetermined high frequency value when sufficient energy is detected in the processed digitized samples during the comparison. The predetermined low frequency value is, for example, 4 MHz.

The predetermined threshold values comprise a predetermined upper threshold value and a predetermined lower threshold value. If the signal amplitude of the processed digitized samples is greater than the predetermined threshold values, the microcontroller 413 detects the presence of a valid analog signal and sets a signal energy detect count (EDCOUNT) value to a large value. The energy detector 417b speeds up the microcontroller 413 n times and sets a clock divide register of the microcontroller 413. The microcontroller 413 determines that further signal processing of the processed digitized samples is required. If the signal amplitude of the processed digitized samples is too small and sufficient energy is not detected by the energy detector 417b, the microcontroller 413 decrements the signal energy detect count value. If the signal energy detect count value is less than zero, the microcontroller 413 detects that a valid analog signal is not present and reduces the speed of the microcontroller 413 by reducing the frequency of the microcontroller 413 to a low frequency value, setting a multiplier of the microcontroller 413 to 1, and changing the setting of the microcontroller 413 to a low power mode to conserve total power needed for the Highway Addressable Remote Transducer (HART) modem 400. The microcontroller 413 then waits for the next analog signal. If the signal energy detect count value is not less than zero, the energy detector 417b speeds up the microcontroller 413 n times and sets the clock divide register of the microcontroller 413. The microcontroller 413 determines that further signal processing of the processed digitized samples is required. If further signal processing of the processed digitized samples is required, the mixers 418 of the coherent phase shift keying demodulator 414 generate 1305 an in-phase component and a quadrature phase component of each of the processed digitized samples by mixing each of the processed digitized samples with an in-phase carrier signal and a quadrature phase carrier signal respectively.

The root raised cosine filters 419 of the coherent phase shift keying demodulator 414 generate 1306 an in-phase (I) signal and a quadrature phase (Q) signal corresponding to each of the processed digitized samples by pulse shaping the generated in-phase component and the generated quadrature phase component of each of the processed digitized samples respectively, as disclosed in the detailed description of FIG.

12. The sample rate of the generated in-phase signal and the generated quadrature phase signal corresponding to each of the processed digitized samples is 6400 Hz. The decision estimator 422 of the coherent phase shift keying demodulator 414 performs 1307 a coarse estimation of a phase error of each of the processed digitized samples by determining a first phase error estimate, a second phase error estimate, and a final phase error correction using the generated in-phase signal and the generated quadrature phase signal corresponding to each of the processed digitized samples.

For coarse estimation of the phase error of each of the processed digitized samples, the decision estimator 422 computes a summation of the generated in-phase signal of each of a predetermined number of the processed digitized samples and a summation of the generated quadrature phase signal of each of the predetermined number of the processed digitized samples. The decision estimator 422 further determines the first phase error estimate to be within a specific quadrant of a phase plane graph, that is, the I/Q plane, based on a sign of the computed summation of the generated in-phase signal of each of the predetermined number of the processed digitized samples and a sign of the computed summation of the generated quadrature phase signal of each of the predetermined number of the processed digitized samples as disclosed in the detailed description of FIG. 16. The decision estimator 422 also determines the second phase error estimate by limiting the determined first phase error estimate to be within a predefined phase angle in the phase plane graph, that is, the I/Q plane, based on a comparison of a magnitude of the computed summation of the generated in-phase signal of each of the predetermined number of the processed digitized samples with a magnitude of the computed summation of the generated quadrature phase signal of each of the predetermined number of the processed digitized samples, and adds the determined second phase error estimate to an initial phase error correction to generate the final phase error correction as disclosed in the detailed description of FIG. 17. The second phase error is estimated to be within 45° in a specific quadrant of the I/Q plane indicated by the first phase error estimate.

Figure 18:
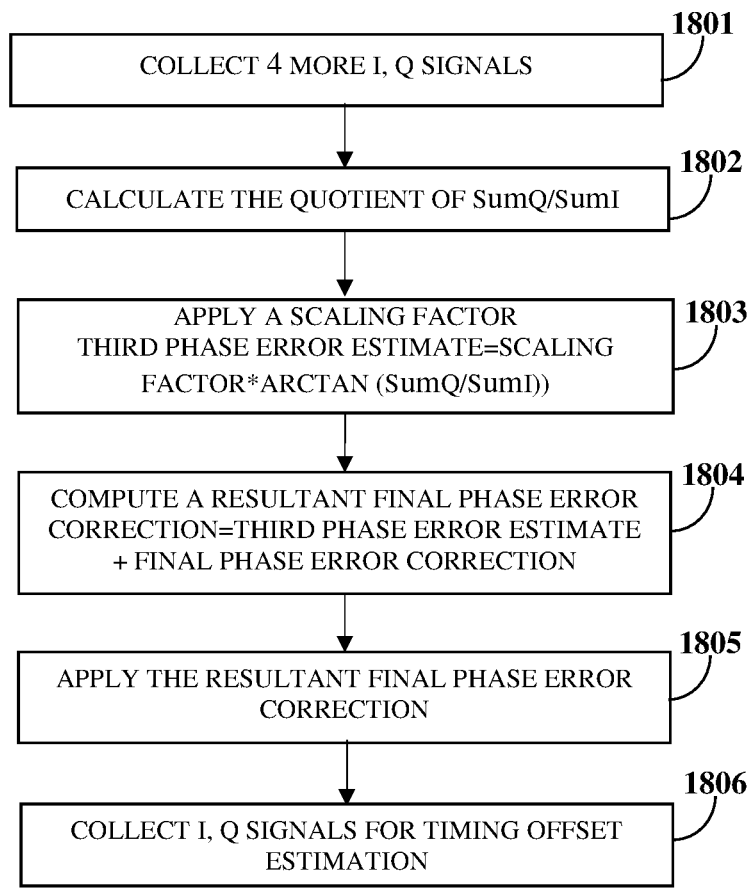
FIG. 18 exemplarily illustrates a flow diagram comprising the steps performed by the decision estimator of the coherent phase shift keying demodulator for performing a fine estimation of the phase error of each of the processed digitized samples.

The decision estimator 422 further performs 1308 a fine estimation of the phase error of each of the processed digitized samples using the determined final phase error correction by determining a resultant final phase error correction as disclosed in the detailed description of FIG. 18. For fine estimation of the phase error of each of the processed digitized samples, the decision estimator 422 computes a summation of the generated in-phase signal of each of a predetermined number of the processed digitized samples and a summation of the generated quadrature phase signal of each of the predetermined number of the processed digitized samples. The decision estimator 422 computes a third phase error estimate equal to an inverse tangent or arctan of a quotient generated on dividing the computed summation of the generated quadrature phase signal of each of the predetermined number of the processed digitized samples by the computed summation of the generated in-phase signal of each of the predetermined number of the processed digitized samples, and computes the resultant final phase error correction on cumulatively adding the third phase error estimate to the determined final phase error correction.

The decision estimator 422 determines coefficients of the adaptive equalizer 423 and estimates 1309 a timing offset in each of the subsequent processed digitized samples. The adaptive equalizer 423 compensates for channel distortions. As used herein, "subsequent processed digitized samples" refer to processed digitized samples to whose corresponding in-phase (I) signals and quadrature phase (Q) signals, a resultant final phase error correction determined from the phase error estimates is applied to obtain fully corrected I signals and fully corrected Q signals. The decision estimator 422 applies the determined resultant final phase error correction to an I signal and a Q signal corresponding to each of the subsequent processed digitized samples. The I signal and the Q signal are generated by the root raised cosine filters 419. The adaptive equalizer 423 weighs the subsequent processed digitized samples based on the determined coefficients and in turn facilitates determination of an optimal sampling time instant in estimating the timing offset in each of the subsequent processed digitized samples, and outputs demodulated digitized samples comprising gray coded symbols mapped to the determined phase error estimates. The output of the adaptive equalizer 423 comprising the demodulated digitized samples is processed by the data slicer 424 into 0s and 1s. The data slicer 424 of the coherent phase shift keying demodulator 414 assembles 1310 a character for character generation of the demodulated digitized samples. The character is a 9-bit character with 8 data bits and 1 parity bit. The 8 data bits represent the Highway Addressable Remote Transducer (HART) message transmitted between the HART modem 400 and the sensor devices 401*a* and 401*b* exemplarily illustrated in FIG. 4. The data slicer 424 assembles the stream of 0s and 1s to the character. Thus, the coherent phase shift keying demodulator 414 comprising the components 416, 417, 418, . . . , 425 exemplarily illustrated in FIG. 12, obtains the 9-bit character.

The coherent phase shift keying demodulator 414 of the Highway Addressable Remote Transducer (HART) modem 400 demodulates the received analog signal in the coherent 8-ary phase shift keying (C8PSK) protocol. In an embodiment, the HART modem 400 demodulates the received analog signal in the frequency shift keying (FSK) protocol The automatic modulation classifier 421 of the coherent phase shift keying demodulator 414 validates presence of the received analog signal in the C8PSK protocol and therefore absence of the received analog signal in the FSK protocol by determining signs of the generated in-phase (I) signal and the generated quadrature phase (Q) signal corresponding to each of the subsequent processed digitized samples after performing the fine estimation of the phase error of each of the processed digitized samples and the estimation of the timing offset in each of the subsequent processed digitized samples of the received analog signal. The detection of the received analog signal in the C8PSK protocol is confirmed by the automatic modulation classifier 421 by determining whether the generated I signal of each of the subsequent processed digitized samples is aligned with a positive amplitude, that is, whether the generated I signals of the subsequent processed digitized samples have an amplitude greater than zero. If the received analog signal is in the FSK protocol, the generated I signals of the subsequent processed digitized samples may not be aligned with positive amplitudes. On validating the presence of the received analog signal in the C8PSK protocol, the automatic modulation classifier 421 infers that the received analog signal is not in the FSK protocol. If the presence of the received analog signal in the C8PSK protocol is negated, the HART modem 400 switches to a FSK demodulation method and detects the received analog signal in the FSK protocol in time. The HART modem 400 utilizes a FSK demodulator to demodulate the received analog signal in the FSK protocol.

Figure 14:
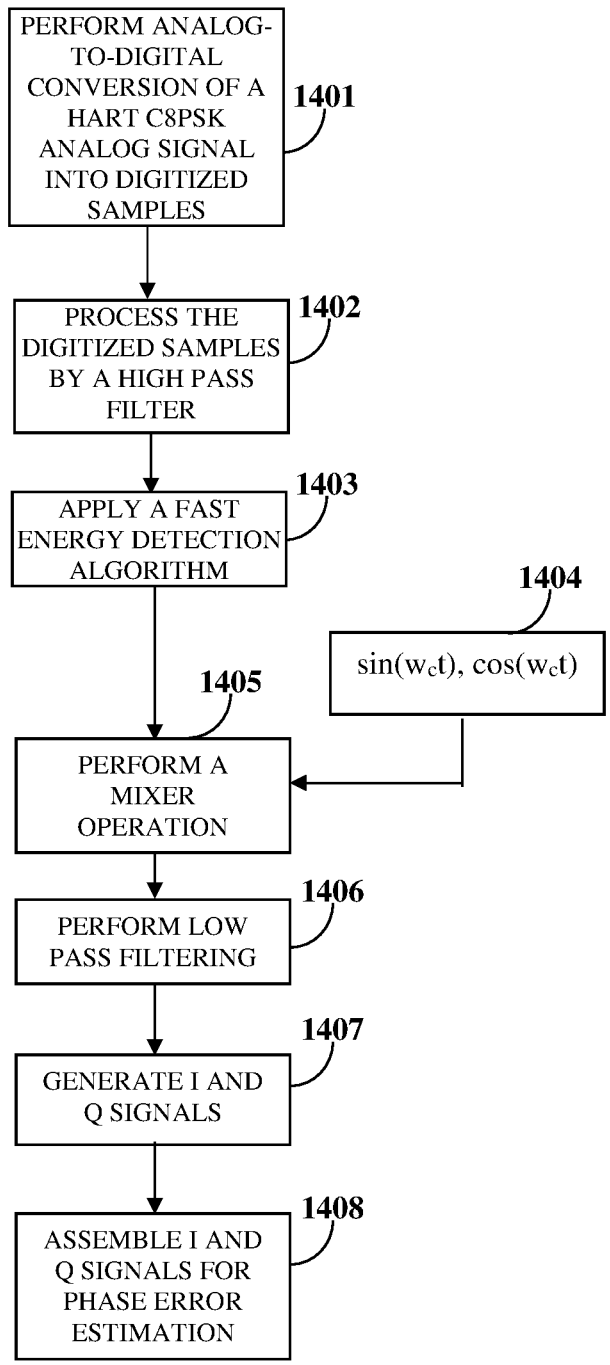
FIG. 14 exemplarily illustrates a flow diagram comprising the steps performed by the coherent phase shift keying demodulator of the Highway Addressable Remote Transducer modem for generating an in-phase signal and a quadrature phase signal corresponding to processed digitized samples.

FIG. 14 exemplarily illustrates a flow diagram comprising the steps performed by the coherent phase shift keying demodulator 414 of the Highway Addressable Remote Transducer (HART) modem 400 exemplarily illustrated in FIG. 4 and FIG. 12, for generating an in-phase (I) signal and a quadrature phase (Q) signal corresponding to the processed digitized samples. The analog-to-digital converter (ADC) 416 of the coherent phase shift keying demodulator 414 exemplarily illustrated in FIG. 4 and FIG. 12, performs 1401 analog-to-digital conversion of an analog signal, that is, a HART coherent 8-ary phase shift keying (C8PSK) analog signal into digitized samples. The high pass filter 417a of the coherent phase shift keying demodulator 414 exemplarily illustrated in FIG. 4 and FIG. 12, processes 1402 the digitized samples as disclosed in the detailed description of FIG. 12. The energy detector 417b exemplarily illustrated in FIG. 4 and FIG. 12, applies 1403 the fast energy detection algorithm. The energy detector 417b further reduces power consumption of the HART modem 400 by incorporating an energy detection method that throttles the clock speed of the microcontroller 413 exemplarily illustrated in FIG. 4, when no valid analog signal is present at the input of the HART modem 400 as disclosed in the detailed description of FIG. 13. The energy detector 417b also dynamically changes the clock of the microcontroller 413 as the processing demand of the HART modem 400 increases. The mixers 418 of the coherent phase shift keying demodulator 414 exemplarily illustrated in FIG. 4 and FIG. 12, perform a mixing operation 1405 by mixing the processed digitized samples with a sine component and a cosine component of a carrier signal 1404 to generate an in-phase component and a quadrature phase component for each of the processed digitized samples, and unwanted high frequency components as disclosed in the detailed description of FIG. 12. The root raised cosine filters 419 of the coherent phase shift keying demodulator 414 exemplarily illustrated in FIG. 4 and FIG. 12, perform pulse shaping and low pass filtering 1406 of the unwanted high frequency components and generate 1407 an in-phase (I) signal and a quadrature phase (Q) signal corresponding to each of the processed digitized samples. The microcontroller 413 assembles 1408 the I signals and Q signals corresponding to the processed digitized samples for phase error estimation.

Figure 15:
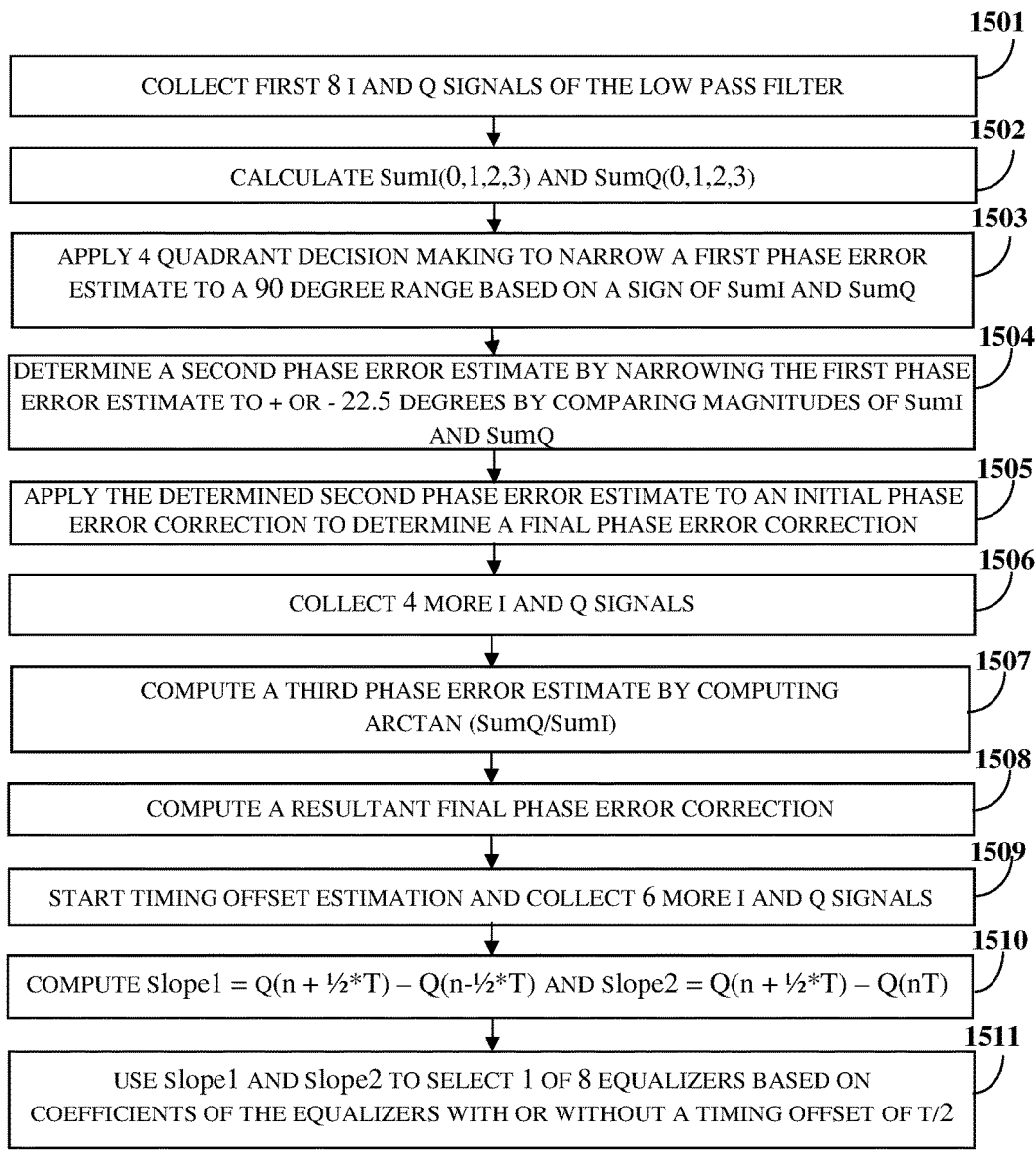
FIG. 15 exemplarily illustrates a flow diagram comprising the steps performed by a decision estimator of the coherent phase shift keying demodulator for performing a coarse estimation and a fine estimation of a phase error of each of processed digitized samples and for estimating a timing offset in each subsequent processed digitized sample.

FIG. 15 exemplarily illustrates a flow diagram comprising the steps performed by the decision estimator 422 of the coherent phase shift keying demodulator 414 exemplarily illustrated in FIG. 4 and FIG. 12, for performing a coarse estimation and a fine estimation of a phase error of each of the processed digitized samples and for estimating a timing offset in each of subsequent processed digitized samples. The decision estimator 422 collects 1501 in-phase (I) signals and quadrature phase (Q) signals corresponding to a predetermined number of processed digitized samples, for example, 8 processed digitized samples from a low pass filter (not shown). For a predetermined number of the processed digitized samples, the decision estimator 422 calculates 1502 a sum of the I signals and a sum of the Q signals. As exemplarily illustrated in FIG. 15, the decision estimator 422 calculates a sum of the I signals corresponding to 4 processed digitized samples, that is, SumI(0,1,2,3), and a sum of the Q signals corresponding to the 4 processed digitized samples, that is, SumQ(0,1,2,3). Using the SumI (0,1,2,3) and the SumQ(0,1,2,3), the decision estimator 422 determines the first phase error estimate and the second phase error estimate. The decision estimator 422 estimates the phase errors using the following equations:

$$\text{Sum}I(m) = A\cos(\Delta\theta)$$

$$\text{Sum}Q(m) = A\sin(\Delta\theta)$$

$\sin(\Delta\theta)$ and $\cos(\Delta\theta)$ have a 90 degree offset relationship with each other and a plot of $\sin(\Delta\theta)$ and $\cos(\Delta\theta)$ for all different phase errors $\Delta\theta$ with $\cos(\Delta\theta)$ along the X-axis of the complex plane, that is, the I-axis of the I/Q plane, and $\sin(\Delta\theta)$ along the Y-axis of the complex plane, that is, the Q-axis of the I/Q plane results in a circle of radius of 1. The values of $\sin(\Delta\theta)$ and $\cos(\Delta\theta)$ have a relationship where the sign of the values determines the quadrant of the I/Q plane where the phase error $\Delta\theta$ lies. The decision estimator 422 applies 1503 four quadrant decision making to narrow the first phase error estimate to a 90° range based on a sign of SumI and SumQ as exemplarily illustrated in FIG. 16.

Furthermore, at 45° and at odd multiples of 45°, the values of $\sin(\Delta\theta)$ and $\cos(\Delta\theta)$ are equal. If the value of $\cos(\Delta\theta)$ is greater than the value of $\sin(\Delta\theta)$, the phase error $\Delta\theta$ is closer to the I-axis of the I/Q plane, and if the value of $\sin(\Delta\theta)$ is greater than the value of $\cos(\Delta\theta)$, the phase error $\Delta\theta$ is closer to Q-axis of the I/Q plane. Based on the above mentioned observations, the decision estimator 422 further narrows down the first phase error estimate to +or −22.5° by comparing magnitudes of SumI and SumQ and determines 1504 a second phase error estimate. That is, if the first phase error estimate is determined to be in the first quadrant of the I/Q plane, the decision estimator 422 narrows the first phase error estimate to less than 45°. If the first phase error estimate is determined to be in the second quadrant of the I/Q plane, the decision estimator 422 narrows the first phase error estimate to greater than 135° and less than 180°. Furthermore, if the value of $\sin(\Delta\theta)$ is significantly greater than the value of $\cos(\Delta\theta)$, that is, the magnitude of SumQ(m) is significantly greater than the magnitude of SumI(m), the second phase error estimate $\Delta\theta$ is closer to the Q-axis of the I/Q plane. If the magnitude of SumI(m) is significantly greater than the magnitude of SumQ(m), the second phase error estimate $\Delta\theta$ is closer to the I-axis of the I/Q plane. The decision estimator 422 applies 1505 the determined second phase error estimate to an initial phase error correction to determine a final phase error correction. The decision estimator 422 performs the method steps 1501 to 1505 for coarse estimation of the phase error in each processed digitized sample corresponding to the received analog signal.

The decision estimator 422 performs fine estimation of the phase error in each processed digitized sample corresponding to the received analog signal. For the fine estimation of the phase error, the decision estimator 422 collects 1506 in-phase (I) signals and quadrature phase (Q) signals corresponding to a predetermined number of the processed digitized samples, for example, 4 processed digitized samples apart from the 4 processed digitized samples used in the coarse estimation of the phase error. The decision estimator 422 calculates a sum of the I signals corresponding to the 4 processed digitized samples SumI(4,5,6,7) and a sum of the Q signals corresponding to the 4 processed digitized samples SumQ(4,5,6,7). The decision estimator 422 computes 1507 a third phase error estimate by computing arctan (SumQ/SumI). Using the third phase error estimate, the decision estimator 422 computes 1508 a resultant final phase error correction using the final phase error correction determined in step 1505. The decision estimator 422 performs the computation of the resultant final phase error correction using an approximation of a tangent of a phase angle being equal to the phase angle for small phase angles and an approximation of the quotient as an estimate of the inverse tangent or arctan. The decision estimator 422 uses the arctan value for determining the third phase error estimate as the tangent function of a phase error is a large number if the phase angle is closer to 90°, and the tangent function of a phase angle is a small number if the phase angle is closer to 0°. The quotient of SumQ/SumI is an approximation of the arctan value and the tangent function of a phase angle is equal to the phase angle for small phase angles.

The coherent phase shift keying demodulator 414 starts 1509 estimation of the timing offset after the decision estimator 422 computes the resultant final phase error correction. The decision estimator 422 collects 1509 in-phase (I) signals and quadrature phase (Q) signals corresponding to a predetermined number of the subsequent processed digitized samples, for example, 6 subsequent processed digitized samples apart from the processed digitized samples used in the coarse estimation and the fine estimation of the phase error. The decision estimator 422 computes 1510 two values, Slope1 and Slope2 using the equations below:

$$\text{Slope1} = Q(n+\tfrac{1}{2}*T) - Q(n-\tfrac{1}{2}*T), \text{ and}$$

$$\text{Slope2} = Q(n+\tfrac{1}{2}*T) - Q(nT)$$

Slope1 defines a delay differencing between the Q signal corresponding to a subsequent processed digitized sample advanced by T/2 and the Q signal corresponding to a subsequent processed digitized sample delayed by T/2, where "T" is a sampling time instant. Slope2 defines a delay differencing between the Q signal corresponding to the subsequent processed digitized sample advanced by T/2 and the Q signal corresponding to a subsequent processed digitized sample at a current time instant. The decision estimator 422 uses 1511 the computed Slope1 and Slope2 to select 1 of 8 equalizers based on coefficients of the equalizers with or without a timing offset of T/2.

Figure 16:
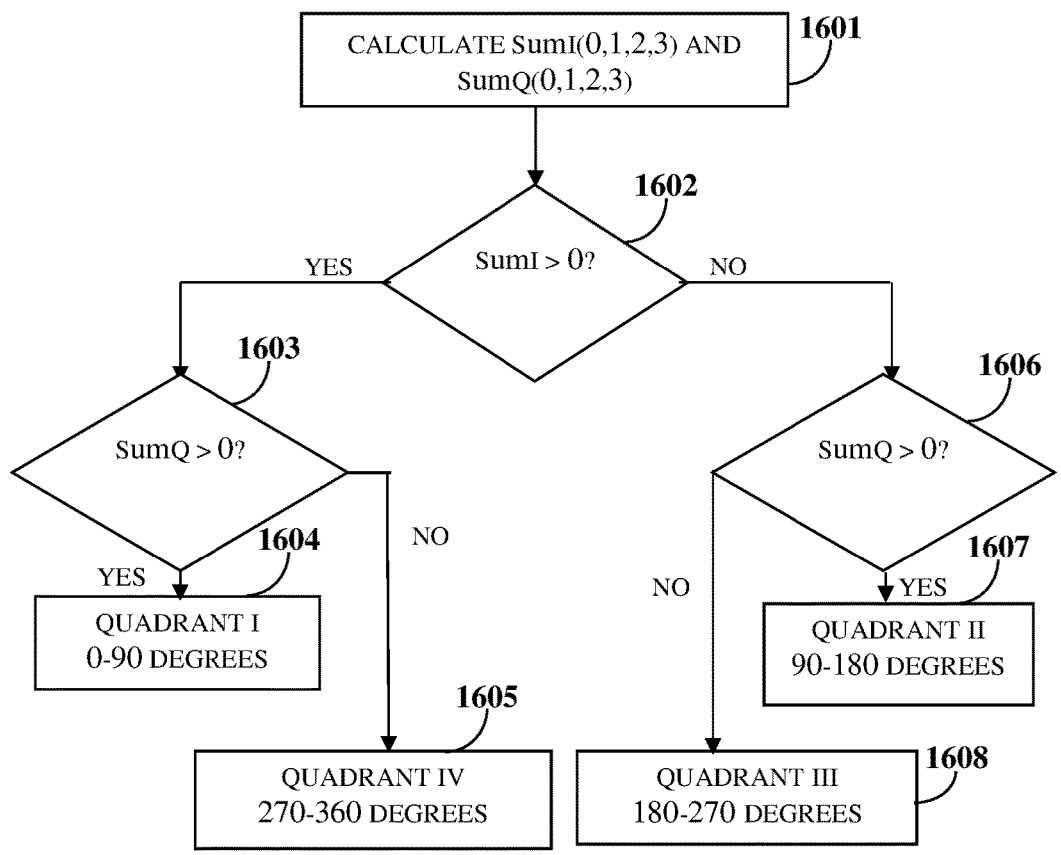
FIGS. 16-17 exemplarily illustrate flowcharts comprising the steps performed by the decision estimator of the coherent phase shift keying demodulator for performing a coarse estimation of a phase error of each of the processed digitized samples.
Figure 17:
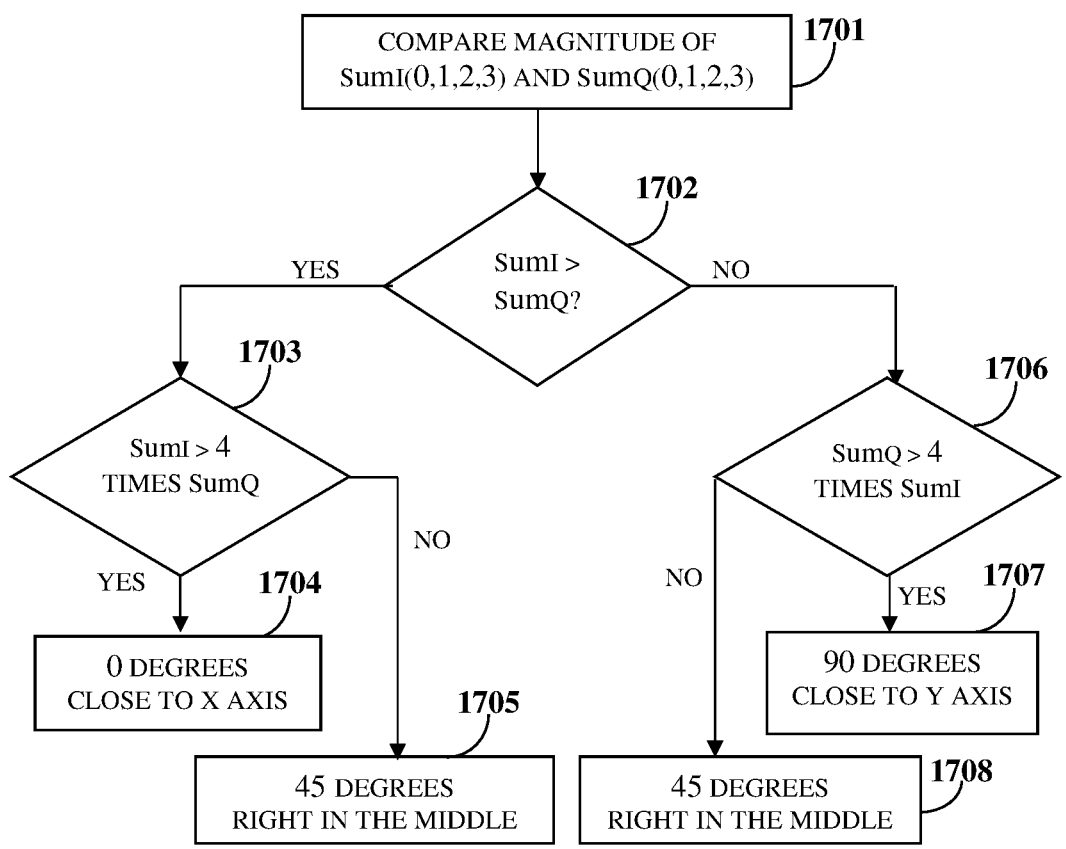

FIGS. 16-17 exemplarily illustrate flowcharts comprising the steps performed by the decision estimator 422 of the coherent phase shift keying demodulator 414 exemplarily illustrated in FIG. 4 and FIG. 12, for performing a coarse estimation of a phase error of each of the processed digitized samples. As exemplarily illustrated in FIG. 16, the decision estimator 422 calculates 1601 a sum of the in-phase (I) signals corresponding to 4 processed digitized samples, that is, SumI(0,1,2,3), and a sum of the quadrature phase (Q) signals corresponding to the 4 processed digitized samples, that is, SumQ(0,1,2,3). The decision estimator 422 determines 1602 the sign of the calculated SumI. If SumI is greater than 0, that is, is SumI is positive, the decision estimator 422 determines 1603 the sign of the calculated SumQ. For a positive SumI, if SumQ is greater than 0, that is, if SumQ is positive, the decision estimator 422 estimates 1604 the first phase error of the processed digitized samples to be in a first quadrant of a phase plane graph, that is, the I/Q plane. Thus, the decision estimator 422 estimates the first phase error of the processed digitized samples to be between 0°-90°. Similarly, for positive SumI, if SumQ is not greater than 0, that is, if SumQ is negative, the decision estimator 422 estimates 1605 the first phase error of the processed digitized samples to be in a fourth quadrant of the I/Q plane. Thus, the decision estimator 422 estimates the first phase error of the processed digitized samples to be between 270°-360°.

If SumI is not greater than 0, that is, if SumI is negative, the decision estimator 422 determines 1606 the sign of the calculated SumQ. If SumQ is greater than 0, that is, if SumQ is positive, the decision estimator 422 estimates 1607 the first phase error of the processed digitized samples to be in a second quadrant of the I/Q plane. Thus, the decision estimator 422 estimates the first phase error of the processed digitized samples to be between 90°-180°. Similarly, for negative SumI, if SumQ is not greater than 0, that is, if SumQ is negative, the decision estimator 422 estimates 1608 the first phase error of the processed digitized samples to be in a third quadrant of the I/Q plane. Thus, the decision estimator 422 estimates the first phase error of the processed digitized samples to be between 180°-270°.

As exemplarily illustrated in FIG. 17, the decision estimator 422 compares 1701 the magnitude of the sum of the in-phase (I) signals corresponding to the 4 processed digitized samples SumI(0,1,2,3) and the sum of the quadrature phase (Q) signals corresponding to the 4 processed digitized samples SumQ(0,1,2,3). The decision estimator 422 determines 1702 whether the magnitude of SumI is greater than the magnitude of SumQ. If the magnitude of SumI is greater than the magnitude of SumQ, the decision estimator 422 determines 1703 whether the magnitude of SumI is greater than four times the magnitude of SumQ. The decision estimator 422 determines the magnitude of SumQ relative to the magnitude of SumI as the arctan(SumQ/SumI) is approximated as SumQ/SumI, and SumQ/SumI represents a tangent function of a phase angle of the processed digitized samples. Furthermore, the tangent function of a phase angle of the processed digitized samples is approximately equal to the phase angle for smaller phase angles. Furthermore, the tangent function of a phase angle is a large number if the phase angle is closer to 90°, and the tangent function of a phase angle is a small number if the phase angle is closer to 0°.

If the magnitude of SumI is greater than four times the magnitude of SumQ, the decision estimator 422 estimates 1704 the second phase error to be closer to 0° since SumQ/SumI<0.25. The arctan(SumQ/SumI<0.25) results in the second phase error estimate that is closer to 0°, less than 45°, and closer to the X-axis in the phase plane graph, that is, closer to the I-axis of the I/Q plane. That is, the second phase error estimate is less than 22.5° and closer to 0°. If the magnitude of SumI is not greater than four times the magnitude of SumQ, that is, the magnitude of SumI is comparable to the magnitude of SumQ, the decision estimator 422 estimates 1705 the second phase error to be closer to 45° since SumQ/SumI~1. The arctan(SumQ/SumI~1) results in the second phase error estimate that is closer to 45° and right in the middle of the phase plane graph, that is, equidistant from the I-axis and the Q-axis of the I/Q plane. That is, the second phase error estimate is greater than 22.5° and less than 45°.

If the magnitude of SumI is not greater than the magnitude of SumQ, the decision estimator 422 determines 1706 whether the magnitude of SumQ is greater than four times the magnitude of SumI. If the magnitude of SumQ is greater than four times the magnitude of SumI, the decision estimator 422 estimates 1707 the second phase error to be closer to 90° since SumQ/SumI>4. The arctan(SumQ/SumI>4) results in the second phase error estimate that is closer to 90° and closer to the Y-axis in the phase plane graph, that is, closer to the Q-axis of the I/Q plane. That is, the second phase error estimate is greater than 67.5° and less than 90°. If the magnitude of SumQ is not greater than four times the magnitude of SumI, that is, the magnitude of SumQ is comparable to the magnitude of SumI, the decision estimator 422 estimates 1708 the second phase error to be closer to 45° since SumQ/SumI~1. The arctan(SumQ/SumI~1) results in the second phase error estimate that is closer to 45° and right in the middle of the phase plane graph, that is, equidistant from the I-axis and the Q-axis of the I/Q plane. That is, the second phase error estimate is less than 67.5° and greater than 45°.

The second phase error estimates closer or away from 0°, 45°, and 90° lie in the first quadrant of the phase plane graph, that is, the I/Q plane. Similarly, the decision estimator 422 estimates the second phase errors in the other three quadrants of the I/Q plane based on the signs of SumI and SumQ and the magnitudes of SumI and SumQ. Consider an example where SumI is positive and SumQ is negative. The decision estimator 422 estimates the first phase error to be in the fourth quadrant of the I/Q plane. That is, the first phase error estimate lies between 270°-360°. The decision estimator 422 determines whether the magnitude of SumI is greater than the magnitude of SumQ. If the magnitude of SumI is greater than the magnitude of SumQ, the decision estimator 422 determines whether the magnitude of SumI is greater than four times the magnitude of SumQ. If the magnitude of SumI is greater than four times the magnitude of SumQ, the decision estimator 422 estimates the second phase error to be closer to 0° in the fourth quadrant as SumQ/SumI<0.25. That is, the decision estimator 422 estimates the second phase error to be closer to 360° and closer to the I-axis in the I/Q plane. Therefore, the second phase error estimate is greater than 337.5° and less than 360°. If the magnitude of SumI is comparable to the magnitude of SumQ, the decision estimator 422 estimates the second phase error to be closer to 45° since SumQ/SumI~1. The arctan(SumQ/SumI~1) results in the second phase error estimate that is closer to 315° and right in the middle of the phase plane graph, that is, equidistant from the I-axis and the Q-axis of the I/Q plane. That is, the second phase error estimate is less than 337.5° and greater than 315°. If the magnitude of SumQ is greater than four times the magnitude of SumI, the decision estimator 422 estimates the second phase error to be closer to 270° since SumQ/SumI>4. The second phase error estimate is less than 315° and greater than 270°. If the magnitude of SumQ is comparable to the magnitude of SumI, the decision estimator 422 estimates the second phase error to be closer to 315° since SumQ/SumI~1. The second phase error estimate is less than 315° and greater than 292.5°.

The decision estimator 422 adds the second phase error estimate to an initial correction to generate a final phase error correction. The final phase error correction is one of the phase angles comprising, for example, 0 degrees (°), 45°, 90°, 135°, 180°, 225°, 270°, and 315°. Using the approximations of arctan (SumQ/SumI) as SumQ/SumI and the tangent function of a phase angle of the processed digitized samples as equal to the phase angle for smaller phase angles, the number of computations in determining the second phase error estimate to be performed by the coherent phase shift keying demodulator 414 of the Highway Addressable Remote Transducer (HART) modem 400 exemplarily illustrated in FIG. 4, is substantially reduced. Therefore, the decision estimator 422 narrows the second phase error estimate down to +/−22.5° within a quadrant identified by the first phase error estimate.

FIG. 18 exemplarily illustrates a flow diagram comprising the steps performed by the decision estimator 422 of the coherent phase shift keying demodulator 414 exemplarily illustrated in FIG. 4 and FIG. 12, for performing a fine estimation of the phase error of each of the processed digitized samples. The decision estimator 422 collects 1801 in-phase (I) signals and quadrature phase (Q) signals corresponding to a predetermined number of the processed digitized samples, for example, 4 processed digitized samples apart from the processed digitized samples used in the coarse estimation of the phase error. The decision estimator 422 calculates a sum of the I signals corresponding to the 4 processed digitized samples SumI(4,5,6,7) and a sum of the Q signals corresponding to the 4 processed digitized samples SumQ(4,5,6,7). The decision estimator 422 calculates 1802 the quotient of SumQ/SumI. The decision estimator 422 computes the arctan value of SumQ/SumI. Since the arctan value of SumQ/SumI is approximately equal to a quotient of SumQ/SumI and the SumQ/SumI represents a tangent function of a phase angle of the processed digitized samples, the SumQ/SumI is used as the arctan value of SumQ/SumI. The decision estimator 422 applies 1803 a scaling factor and determines a third phase error estimate as scaling factor*arctan(SumQ/SumI) or scaling factor*the quotient of SumQ/SumI. The scaling factor normalizes the values of SumQ and SumI. The third phase error estimate is a specific small angle for phase error correction. The decision estimator 422 computes 1804 a resultant final phase error correction on cumulatively adding the third phase error estimate to the final phase error correction, and applies 1805 the resultant final phase error correction.

After the resultant final phase error correction is applied, the decision estimator 422 collects 1806 in-phase (I) signals and quadrature phase (Q) signals corresponding to a predetermined number of subsequent processed digitized samples for estimation of a timing offset. The I signals are fully corrected I signals and the Q signals are fully corrected Q signals as disclosed in the detailed description of FIG. 13. The preamble of the Highway Addressable Remote Transducer (HART) message that is used for estimating the timing offset is a train of repetition of symbols 6, 2, 6, 2, 6, . . . , 2 for a period of 40 symbols. The symbol 6 has a phase angle of +67.5° and the symbol 2 has a phase angle of −67.5° as exemplarily illustrated in FIG. 6. The in-phase components corresponding to the symbols 6 and 2 have positive high amplitudes and the quadrature phase components corresponding to the symbols 6 and 2 have high positive and high negative amplitudes respectively. For the preamble of the HART message, the values of the Q signal generated from the quadrature phase component resemble a sinewave. Therefore, after phase error estimation is performed and the resultant final phase error correction is applied on the I signals and the Q signals corresponding to a predetermined number of the subsequent processed digitized samples, the amplitudes of the fully corrected I signals are positive and the amplitudes of the fully corrected Q signals resemble a sinewave.

Figure 19:
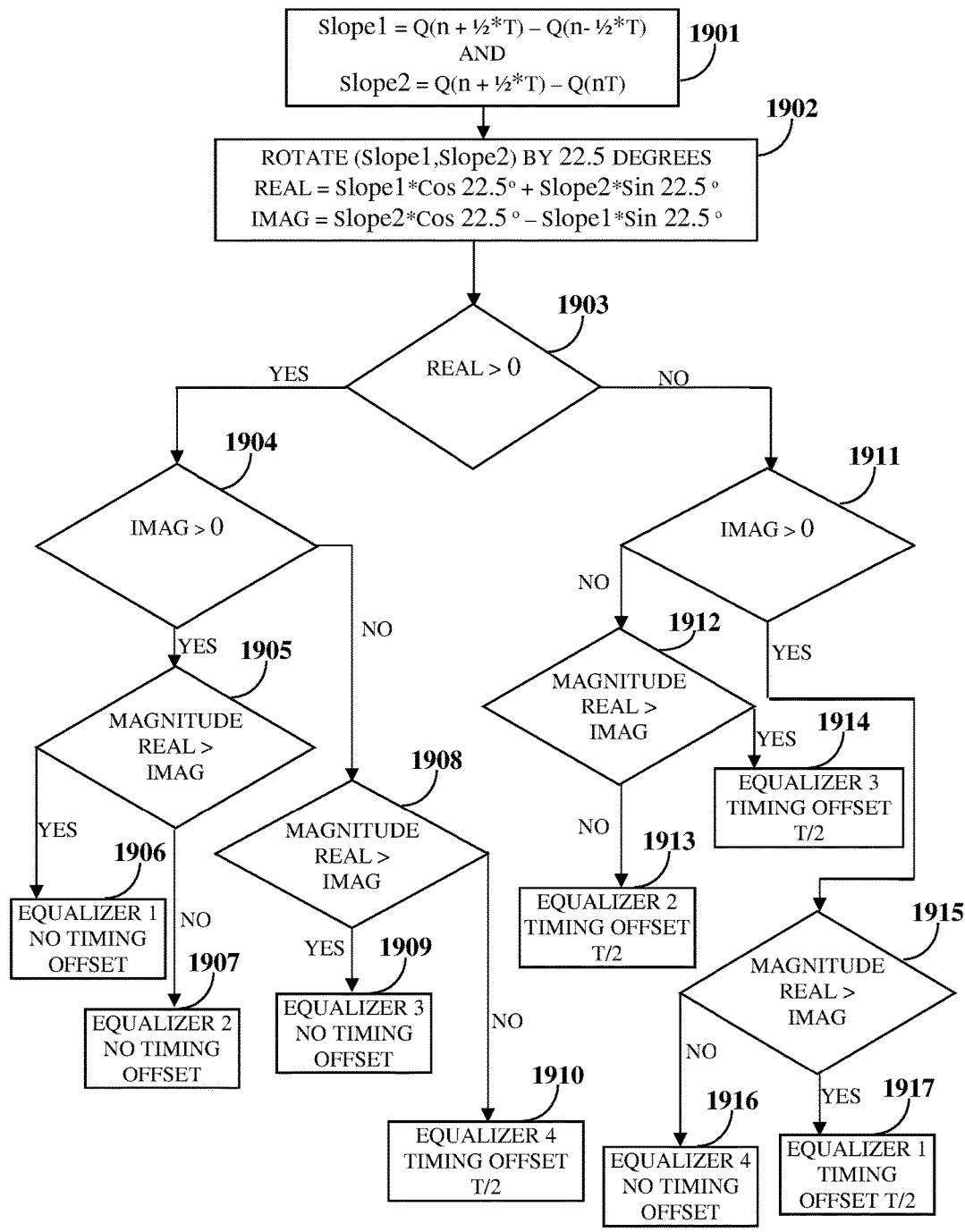
FIG. 19 exemplarily illustrates a flowchart comprising the steps performed by the decision estimator of the coherent phase shift keying demodulator for determining coefficients of an equalizer and estimating a timing offset.

FIG. 19 exemplarily illustrates a flow chart comprising steps performed by the decision estimator 422 of the coherent phase shift keying demodulator 414 exemplarily illustrated in FIG. 4 and FIG. 12, for determining coefficients of an equalizer and estimating a timing offset. Estimation of the timing offset comprises determining an optimal sampling time instant that is the middle of a symbol. Since the amplitudes of the quadrature phase (Q) signal of the subsequent processed digitized samples resemble a sinewave based on the preamble, estimating phase of the Q signal facilitates determination of the optimal sampling time instant. The decision estimator 422 computes 1901 two values, Slope1 and Slope2, defined by the equations below as disclosed in the detailed description of FIG. 15.

$$Slope1=Q(n+½*T)-Q(n-½*T), \text{ and}$$

$$Slope2=Q(n+½*T)-Q(nT)$$

Slope1 and Slope2 are two rate of change values of the quadrature phase (Q) signals corresponding to a predetermined number of the subsequent processed digitized samples over a predetermined time period. Slope1 and Slope2 are representative sine and cosine components of the Q signals corresponding to the predetermined number of the subsequent processed digitized samples that are part of the preamble. The calculated slopes of Q signals, that is, Slope1 and Slope2, make an estimate of where the zero crossing transitions in the I/Q plane occur and select an optimal equalizer and timing offset for a given shape of the Q signal. The coordinate rotation digital computer (CORDIC) 420 of the coherent phase shift keying demodulator 414 exemplarily illustrated in FIG. 4 and FIG. 12, rotates 1902 Slope1 and Slope2 by 22.5° using a Cartesian rotation method. The decision estimator 422 computes REAL and IMAGINARY variables using the computed Slope1 and Slope2 as follows:

$$REAL=Slope1*Cos\ 22.5°+Slope2*Sin\ 22.5°$$

$$IMAG=Slope2*Cos\ 22.5°-Slope1*Sin\ 22.5°$$

The Cartesian rotation performed by the coordinate rotation digital computer (CORDIC) 420 simplifies work of the decision estimator 422 in comparing the magnitudes and the signs of the REAL variable and the IMAG variable. Based on the signs and the magnitudes of the REAL variable and the IMAG variable, the decision estimator 422 determines an optimal sampling time instant and a corresponding equalizer. The adaptive equalizer 423 in the coherent phase shift keying demodulator 414 exemplarily illustrated in FIG. 4 and FIG. 12, is one of the eight equalizers with a sampling time instant T being equal to 1/3200 Hz. The timing offset is mapped to one of two timing offsets, that is, no timing offset or a timing offset of T/2. The timing offset of T/2 represents a sampling time instant of a subsequent processed digitized sample of the received analog signal that is offset from the optimal sampling time instant nT by T/2 seconds. The amplitudes of the Q signals corresponding to the subsequent processed digitized samples at the time instants n+½*T and n-½*T is negative and positive respectively, and the phases of the Q signals corresponding to the subsequent processed digitized samples at the time instants n+½*T or n-½*T are 180° out of phase with respect to each other. That is, a zero crossing transition in the I/Q plane has occurred at the optimal sampling time instant nT and the timing offset T/2 from nT indicates if early sampling or late sampling of the received analog signal has occurred in the coherent phase keying demodulator 414. The decision estimator 422 selects an equalizer with or without the timing offset of T/2 based on the time instant of zero crossing transitions and corrects the timing offsets.

The decision estimator 422 determines 1903 the sign of the REAL variable. If the REAL variable is greater than 0, that is, if the REAL variable is positive, the decision estimator 422 determines 1904 the sign of the IMAG variable. If the IMAG variable is greater than 0, the decision estimator 422 determines 1905 the magnitude of the REAL variable and the IMAG variable. The decision estimator 422 determines to which of the four quadrants of the I/Q plane the REAL variable and the IMAG variable belong. If the magnitude of the REAL variable is greater than the magnitude of the IMAG variable, the decision estimator 422 selects 1906 equalizer 1 with no timing offset. If the magnitude of the REAL variable is not greater than the magnitude of the IMAG variable, the decision estimator 422 selects 1907 equalizer 2 with no timing offset. If the REAL variable is greater than 0 and the IMAG variable is not greater than 0, the decision estimator 422 determines 1908 the magnitude of the REAL variable and the IMAG variable. If the magnitude of the REAL variable is greater than the magnitude of the IMAG variable, the decision estimator 422 selects 1909 equalizer 3 with no timing offset. If the magnitude of the REAL variable is not greater than the magnitude of the IMAG variable, the decision estimator 422 selects 1910 equalizer 4 with a timing offset T/2.

If the REAL variable is not greater than 0, that is, if the REAL variable is negative, the decision estimator 422 determines 1911 the sign of the IMAG variable. If the REAL variable is not greater than 0 and the IMAG variable is not greater than 0, the decision estimator 422 determines 1912 the magnitude of the REAL variable and the IMAG variable. If the magnitude of the REAL variable is not greater than the magnitude of the IMAG variable, the decision estimator 422 selects 1913 equalizer 2 with a timing offset T/2. If the magnitude of the REAL variable is greater than the magnitude of the IMAG variable, the decision estimator 422 selects 1914 equalizer 3 with a timing offset T/2. If the IMAG variable is greater than 0, the decision estimator 422 determines 1915 the magnitude of the REAL variable and the IMAG variable. If the magnitude of the REAL variable is not greater than the magnitude of the IMAG variable, the decision estimator 422 selects 1916 equalizer 4 with no timing offset. If the magnitude of the REAL variable is greater than the magnitude of the IMAG variable, the decision estimator 422 selects 1917 equalizer 1 with a timing offset T/2. When the equalizer is selected, the equalizer is allowed to adapt to a full convergence and the demodulation of the received analog signal results in a proper decoding of Highway Addressable Remote Transducer (HART) message with lower computational requirements.

The foregoing examples have been provided merely for explanation and are in no way to be construed as limiting of the methods and the Highway Addressable Remote Transducer (HART) modem 400 exemplarily illustrated in FIG. 4, disclosed herein. While the methods and the HART modem 400 have been described with reference to various embodiments, it is understood that the words, which have been used herein, are words of description and illustration, rather than words of limitation. Furthermore, although the methods and the HART modem 400 have been described herein with reference to particular means, materials, and embodiments, the methods and the HART modem 400 are not intended to be limited to the particulars disclosed herein; rather, the methods and the HART modem 400 extend to all functionally equivalent structures, methods and uses, such as are within the scope of the appended claims. While multiple embodiments are disclosed, it will be understood by those skilled in the art, having the benefit of the teachings of this specification, that the methods and the HART modem 400 disclosed herein are capable of modifications, and other embodiments may be effected and changes may be made thereto, without departing from the scope and spirit of the methods and the HART modem 400 disclosed herein.

I claim:

1. A method for modulating and transmitting an analog signal comprising a highway addressable remote transducer message, said method comprising:

providing a highway addressable remote transducer modem comprising analog-to-digital converters, a parallel-to-serial converter, a gray coder, a coherent phase shift keying modulator, a digital-to-analog converter, at least one microcontroller configured to execute computer program instructions for operating said highway addressable remote transducer modem, and a non-transitory computer readable storage medium for storing a predefined gray code lookup table and a pre-generated sample lookup table;

receiving and converting said analog signal comprising said highway addressable remote transducer message into digitized samples by one of said analog-to-digital converters, by sampling and digitizing said received analog signal at a sampling rate;

converting said highway addressable remote transducer message in said digitized samples into serial data bit streams comprising binary information by said parallel-to-serial converter;

dividing each of said serial data bit streams into symbols and gray coding said symbols by said gray coder using said predefined gray code lookup table, each of said symbols comprising a predetermined number of consecutive bits in each of said serial data bit streams and representing a predetermined number of said digitized samples;

generating an index vector of said pre-generated sample lookup table for indexing a phase modulated digital signal in said pre-generated sample lookup table by said at least one microcontroller by grouping a predetermined number of said gray coded symbols and said predetermined number of said digitized samples;

determining said phase modulated digital signal in said pre-generated sample lookup table, corresponding to said generated index vector of said pre-generated sample lookup table, by said at least one microcontroller for reducing power intensive computations in phase modulation by said coherent phase shift keying modulator; and transmitting a phase modulated analog signal comprising said highway addressable remote transducer message, converted from said determined phase modulated digital signal, to one or more sensor devices by said digital-to-analog converter via a serial peripheral interface of said highway addressable remote transducer modem.

2. The method of claim 1, further comprising:

determining in-phase components and quadrature phase components of pre-gray coded symbols corresponding to analog signals received by said highway addressable remote transducer modem by said at least one microcontroller by mapping said pre-gray coded symbols to predetermined phase angles in said predefined gray code lookup table;

pulse shaping said determined in-phase components and said determined quadrature phase components of said pre-gray coded symbols corresponding to said received analog signals by root raised cosine filters of said coherent phase shift keying modulator;

modulating said pulse shaped in-phase components and said pulse shaped quadrature phase components with a carrier signal by mixers of said coherent phase shift keying modulator for generating phase modulated digital signals; and storing said generated phase modulated digital signals in said pre-generated sample lookup table by said at least one microcontroller.

3. The method of claim 2, wherein said pre-generated sample lookup table is generated by said at least one microcontroller using said pre-gray coded symbols based on a frequency of said carrier signal being in synchronization with a baud rate of a phase modulated analog signal to be transmitted to said one or more sensor devices.

4. The method of claim 1, wherein a sample rate of said transmitted phase modulated analog signal is one of 12800 hertz and 25600 hertz.

5. The method of claim 1, wherein said index vector of said pre-generated sample lookup table comprises 3 n bits representing n gray coded symbols and m bits representing an index of said predetermined number of said digitized samples in said each of said gray coded symbols.

6. The method of claim 5, wherein values of n and m in said index vector of said pre-generated sample lookup table are 3 resulting in said index vector of 12 bits indexing said phase modulated digital signal in said pre-generated sample lookup table of size of base 2 raised to an exponent of 12.

7. A method for demodulating an analog signal comprising a highway addressable remote transducer message, said method comprising:

providing a highway addressable remote transducer modem comprising a coherent phase shift keying demodulator and at least one microcontroller configured to execute computer program instructions for operating said highway addressable remote transducer modem, said coherent phase shift keying demodulator comprising analog-to-digital converters, a high pass filter, an energy detector, mixers, root raised cosine filters, a decision estimator, an adaptive equalizer, and a data slicer;

receiving and converting said analog signal comprising said highway addressable remote transducer message into digitized samples using one of said analog-to-digital converters, by sampling and digitizing said received analog signal at a sampling rate;

processing said digitized samples by said high pass filter for removing low frequency interfering signals from said digitized samples;

comparing signal amplitudes of said processed digitized samples with predetermined threshold values and applying a fast energy detection algorithm on said processed digitized samples by said at least one microcontroller using said energy detector for determining further signal processing of said processed digitized samples;

generating an in-phase component and a quadrature phase component of each of said processed digitized samples by said mixers by mixing said each of said processed digitized samples with an in-phase carrier signal and a quadrature phase carrier signal respectively;

generating an in-phase signal and a quadrature phase signal corresponding to said each of said processed digitized samples by said root raised cosine filters by pulse shaping said generated in-phase component and said generated quadrature phase component of said each of said processed digitized samples respectively;

performing a coarse estimation of a phase error of said each of said processed digitized samples by said decision estimator by determining a final phase error correction using said generated in-phase signal and said generated quadrature phase signal corresponding to said each of said processed digitized samples;

performing a fine estimation of said phase error of said each of said processed digitized samples by said decision estimator using said determined final phase error correction by determining a resultant final phase error correction;

estimating a timing offset in each of subsequent said processed digitized samples by said decision estimator on applying said determined resultant final phase error correction to an in-phase signal and a quadrature phase signal generated by said root raised cosine filters corresponding to said each of said subsequent said processed digitized samples and on determining coefficients of said adaptive equalizer by said decision estimator for obtaining demodulated digitized samples; and assembling a character for character generation of said demodulated digitized samples by said data slicer.

8. The method of claim 7, wherein said coarse estimation of said phase error of said each of said processed digitized samples by said decision estimator is performed by:

computing a summation of said generated in-phase signal of each of a predetermined number of said processed digitized samples and a summation of said generated quadrature phase signal of said each of said predetermined number of said processed digitized samples;

determining a first phase error estimate to be within a specific quadrant of a phase plane graph based on a sign of said computed summation of said generated in-phase signal of said each of said predetermined number of said processed digitized samples and a sign of said computed summation of said generated quadrature phase signal of said each of said predetermined number of said processed digitized samples;

determining a second phase error estimate by limiting said determined first phase error estimate to be within a predefined phase angle in said phase plane graph based on a comparison of a magnitude of said computed summation of said generated in-phase signal of said each of said predetermined number of said processed digitized samples with a magnitude of said computed summation of said generated quadrature phase signal of said each of said predetermined number of said processed digitized samples; and adding said determined second phase error estimate to an initial phase error correction to generate said final phase error correction.

9. The method of claim 8, wherein said final phase error correction is one of phase angles comprising 0 degrees, 45 degrees, 90 degrees, 135 degrees, 180 degrees, 225 degrees, 270 degrees, and 315 degrees.

10. The method of claim 7, wherein said fine estimation of said phase error of said each of said processed digitized samples by said decision estimator using said determined final phase error correction is performed by:

computing a summation of said generated in-phase signal of each of a predetermined number of said processed digitized samples and a summation of said generated quadrature phase signal of said each of said predetermined number of said processed digitized samples;

computing a third phase error estimate equal to an inverse tangent of a quotient generated on dividing said computed summation of said generated quadrature phase signal of said each of said predetermined number of said processed digitized samples by said computed summation of said generated in-phase signal of said each of said predetermined number of said processed digitized samples; and computing said resultant final phase error correction on cumulatively adding said third phase error estimate to said determined final phase error correction.

11. The method of claim 10, wherein said computation of said resultant final phase error correction is performed by said decision estimator using an approximation of a tangent of a phase angle being equal to said phase angle for small phase angles and an approximation of said quotient as an estimate of said inverse tangent.

12. The method of claim 7, wherein said sampling rate is 12800 hertz.

13. The method of claim 7, wherein said adaptive equalizer is one of eight equalizers with a sampling time instant being equal to 1/3200 hertz.

14. The method of claim 7, wherein said timing offset is mapped to one of two timing offsets.

15. The method of claim 7, further comprising validating presence of said analog signal in a coherent 8-ary phase shift keying protocol and absence of said analog signal in a frequency shift keying protocol by an automatic modulation classifier of said coherent phase shift keying demodulator by determining signs of said generated in-phase signal and said generated quadrature phase signal corresponding to said each of said subsequent said processed digitized samples after performing said fine estimation of said phase error of said each of said processed digitized samples and said estimation of said timing offset in said each of said subsequent said processed digitized samples.

* * * * *